United States Patent
Iba

[11] Patent Number: 5,854,665
[45] Date of Patent: Dec. 29, 1998

[54] LIQUID CRYSTAL DEVICE WITH OPTICAL MEMBER HAVING A PLANAR EXTENSION IN PARALLEL WITH THE SUBSTRATES AND NON-UNIFORM OPTICAL ANISOTROPY ALONG THE PLANAR EXTENSION

[75] Inventor: Jun Iba, Atsugi, Japan

[73] Assignee: Canon Kabushiki Kaisha, Tokyo, Japan

[21] Appl. No.: 499,296

[22] Filed: Jul. 6, 1995

[30] Foreign Application Priority Data

Jul. 6, 1994 [JP] Japan .................................. 6-179416
Apr. 21, 1995 [JP] Japan .................................. 7-097261

[51] Int. Cl.$^6$ .............................. G02F 1/1335; G02F 1/13
[52] U.S. Cl. ........................... 349/119; 349/95; 349/106; 349/121; 349/201; 356/361
[58] Field of Search .................................. 349/117, 119, 349/121, 106, 201, 95; 359/256, 282, 291, 652, 653, 654, 663; 356/361

[56] References Cited

U.S. PATENT DOCUMENTS 4,836,652  6/1989  Oishi et al. ................................ 349/95
5,150,235  9/1992  Haim et al. ............................... 349/117
5,179,457  1/1993  Hirataka et al. ........................ 349/119
5,225,920  7/1993  Kasazumi et al. ....................... 349/117
5,311,339  5/1994  Fertig et al. ............................. 349/119

OTHER PUBLICATIONS

SID Proceedings, The 10th International Display Research Conference (1990) pp. 248–251.
J. J. Appl. Phys. vol. 29, No. 10 (1990) L1859–L1855.
Japanese Journal of Applied Physics, Oct. 1990 v. 29 No. 10, pp. L1856–L1858 (K. Nakahigashi et al.)

*Primary Examiner*—William L. Sikes
*Assistant Examiner*—Julie Ngo
*Attorney, Agent, or Firm*—Fitzpatrick, Cella, Harper & Scinto

[57] ABSTRACT

A liquid crystal device is constituted by a pair of substrates, a liquid crystal disposed between the substrates, and an optical member having a planar extension in parallel with the substrates and a non-uniform optical anisotropy along the planar extension. As a result, it is possible to realize a liquid crystal device capable of irregularity-free optical modulation, particularly a liquid crystal display device capable of providing display images with improved contrast and viewing angle characteristic.

20 Claims, 14 Drawing Sheets

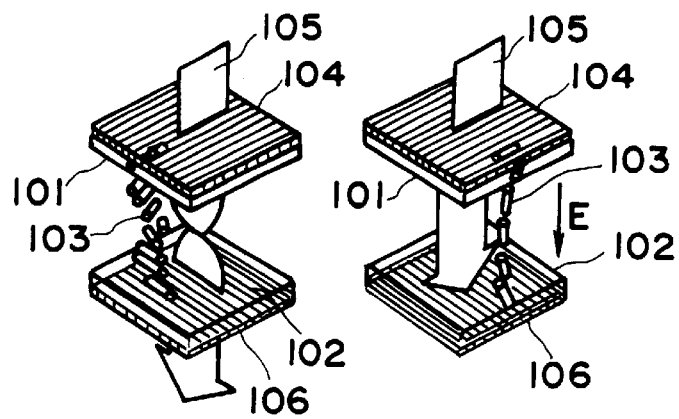
FIG. 1A
PRIOR ART
FIG. 1B
PRIOR ART
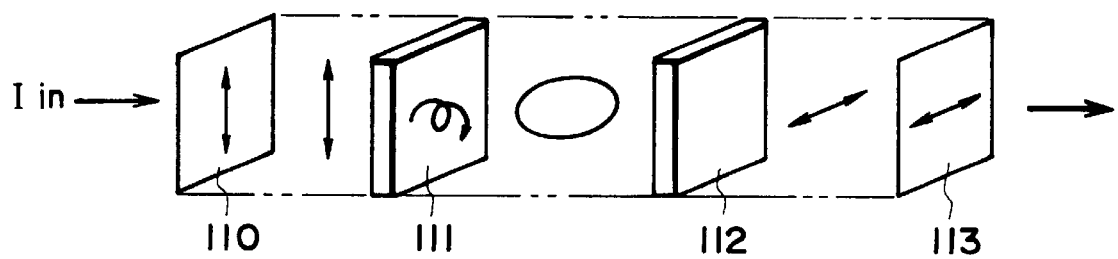
FIG. 2
PRIOR ART
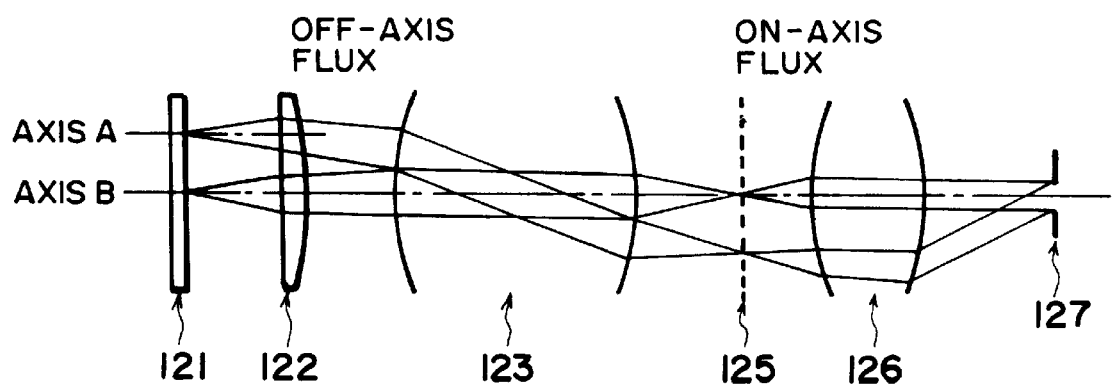
FIG. 3
PRIOR ART

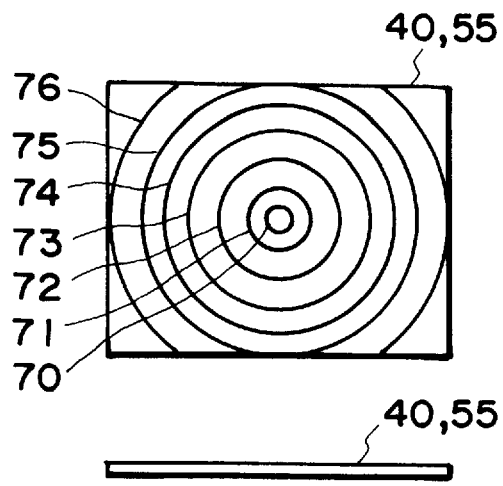
FIG. 15A
FIG. 15B
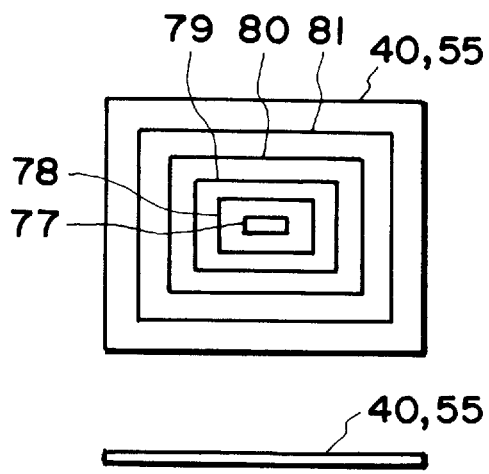
FIG. 16A
FIG. 16B
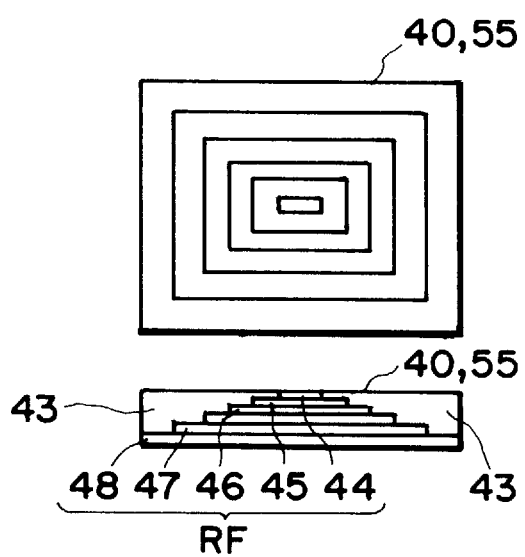
FIG. 17A
FIG. 17B

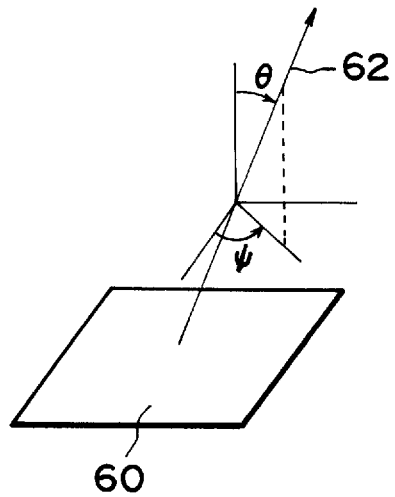
F I G. 18A
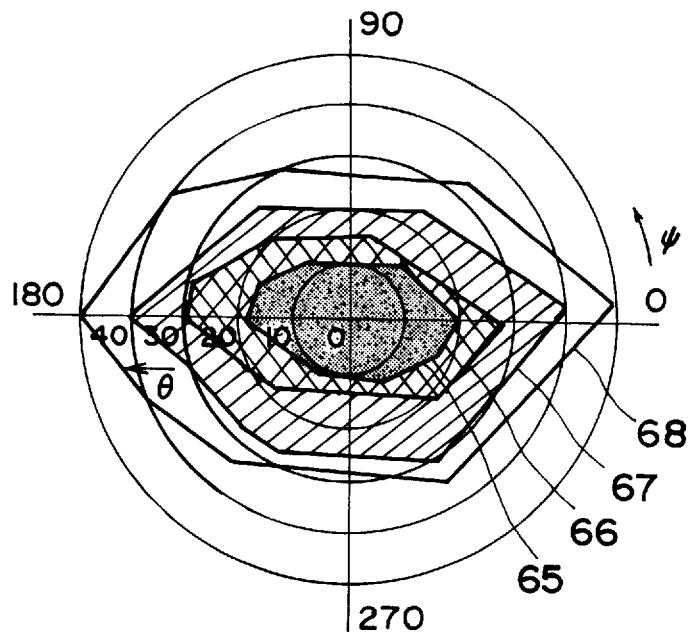
F I G. 18B
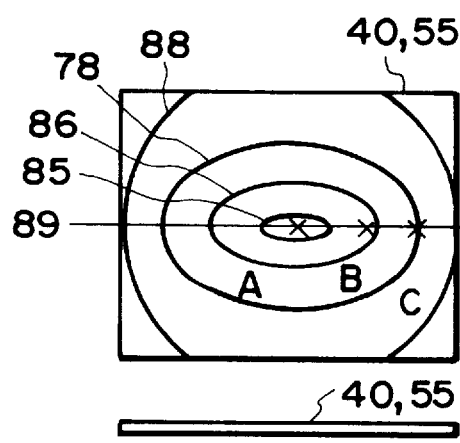
F I G. 19A
F I G. 19B

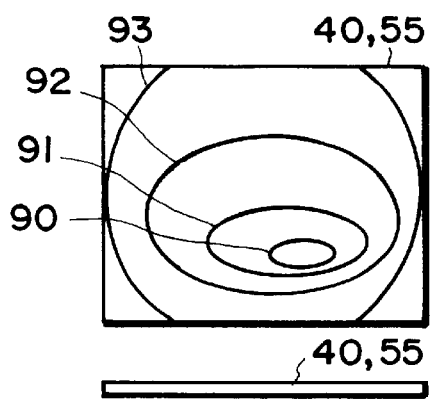
FIG. 21A
FIG. 21B
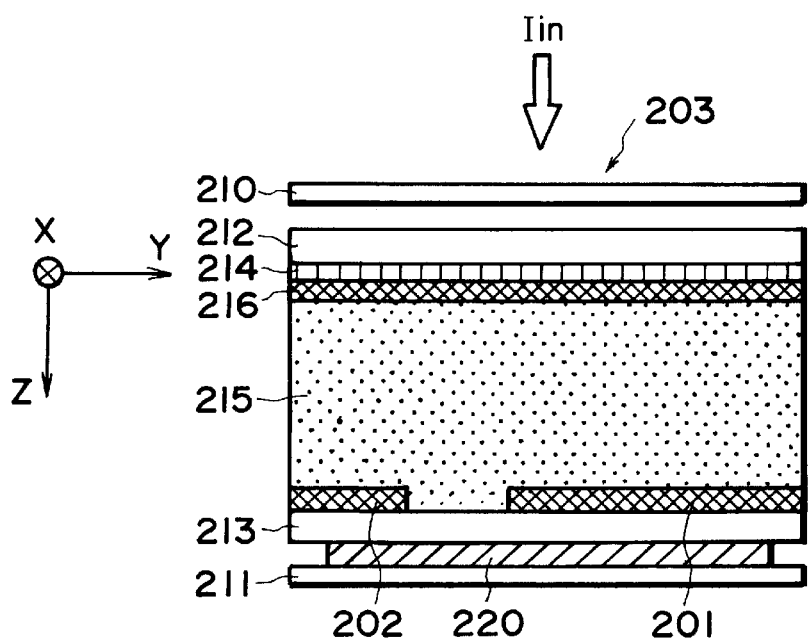
FIG. 22
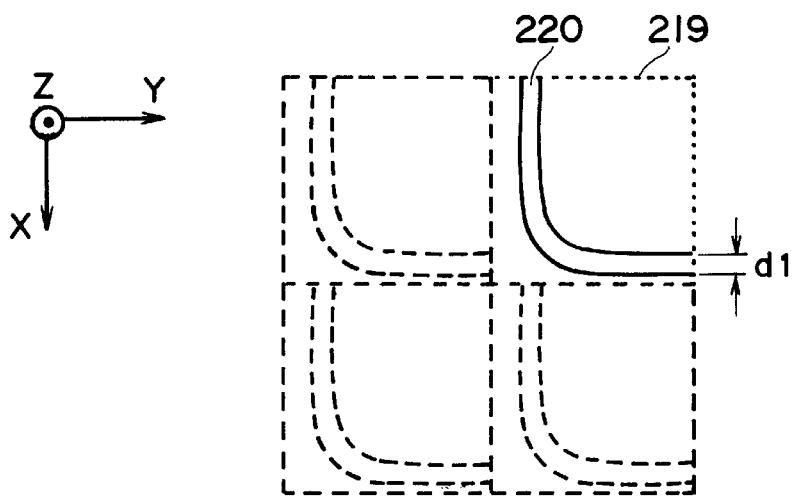
FIG. 23

LIQUID CRYSTAL DEVICE WITH OPTICAL MEMBER HAVING A PLANAR EXTENSION IN PARALLEL WITH THE SUBSTRATES AND NON-UNIFORM OPTICAL ANISOTROPY ALONG THE PLANAR EXTENSION

FIELD OF THE INVENTION AND RELATED ART

The present invention relates to a liquid crystal device, particularly a liquid crystal display device. More specifically, the present invention relates to a liquid crystal (display) device capable of providing display images with an improved contrast and an improved viewing angle characteristic, capable of providing a compact optical system and capable of suppressing occurrence of bright lines due to disclination.

In order to clarify the background of the invention, a basic operation of a liquid crystal device will be briefly described with reference to FIGS. 1A and 1B, which show states of a pixel of a TN (twisted nematic)-mode liquid crystal display device under no electric field and under an electric field E, respectively.

Referring to FIGS. 1A and 1B, reference numerals 101 and 102 respectively denote a glass substrate; 103, liquid crystal molecules; 104, a polarizer (incident light side); 105, a polarized plane of incident light; and 106, an analyzer (outgoing or emission light side). In the liquid crystal display device according to the TN-mode as shown, liquid crystal molecules 103 sandwiched between the pair of glass substrates 101 and 102 are aligned under no electric field in a twisted state with a twist angle of, e.g., 90 degrees, as shown in FIG. 1A due to an aligning function of, e.g., polyimide alignment films (not shown) disposed so as to contact the liquid crystal layer comprising liquid crystal molecules 103 on the substrate surfaces.

In this state, the polarized plane 105 of the incident light transmitted through the polarizer 104 is rotated along the twist alignment of the liquid crystal molecules 103 in the liquid crystal layer. As a result, the incident reaches the analyzer 106 after rotation by 90 degrees of its polarized plane 105. The transmission axis of the analyzer 106 is set to be perpendicular to that of the polarizer 104, so that the light is transmitted therethrough to provide a white (or bright) display state.

On the other hand, under application of a sufficient electric field E as shown in FIG. 1B, liquid crystal molecules 103 in the liquid crystal layer are re-aligned to be parallel to the electric field, so that the incident light reaches the analyzer 106 without rotating its polarized plane 105, i.e., with its polarized plane 105 perpendicular to the transmission axis of the analyzer 106. Accordingly, the outgoing light from the liquid crystal is intercepted by the analyzer to provide a black (or dark) display state.

The above-described display mode wherein two polarizers are disposed with their transmission axes perpendicular to each other and a bright (white) state is switched to a dark (black) state by application of an electric field is called a normally white (or positive) display mode. A halftone may be displayed by applying a controlled voltage according to an applied voltage-dependent light transmission characteristic of the liquid crystal. The above description has been made with reference to a liquid crystal display device. However, the same operation may also be adopted in other liquid crystal devices, such as a liquid crystal shutter or light valve.

Ideally, it is desired that linear polarized light incident to the liquid crystal is optically rotated by 90 degrees under no electric field and passes as it is under an electric field. In the TN-mode, however, the incident light to the liquid crystal layer is optically rotated by utilizing birefringence by the liquid crystal and therefore the outgoing light from the liquid crystal layer actually becomes elliptically polarized light due to occurrence of phase modulation caused by the birefringence. Particularly, in the case of an aligning treatment for providing liquid crystal molecules with a pretilt angle, the ellipticalness of the outgoing light is enhanced compared with the case of no pretilt angle.

Further, light obliquely incident to the glass substrate surface (pixel plane) is also subject to phase modulation to provide elliptically polarized outgoing light, and the degree of the phase modulation depends on the incidence angle of the incident light.

Due to such phase modulation, a liquid crystal display device is liable to show lower display performances, such as a lower contrast and a viewing angle-dependence of contrast. Accordingly, various proposals have been made for solving these problems in TN-mode liquid crystal devices.

A first proposal is a phase compensation which will be described with reference to FIG. 2 which is a schematic explosion view of a TN-mode liquid crystal device in a white display state. In this method, between a TN-mode liquid crystal cell 111 comprising a nematic liquid crystal sandwiched between a pair of substrates and an analyzer 113, a phase plate 112 having a uniaxial or biaxial birefringence is inserted as an optical member for compensating the above mentioned phase modulation to improve the contrast and the viewing angle characteristic.

More specifically, incident light Iin from a left side becomes linearly polarized light through a polarizer 110 and is subjected to the optical rotation and birefringence of the liquid crystal when it passes through the liquid crystal cell 111, to become elliptically polarized light having a certain directionality. Then, by inserting the phase plate having an appropriate degree of retardation $\delta = \Delta nd$ ($\Delta n$: refractive index difference between ordinary ray and extraordinary ray, d: thickness of medium), the elliptical polarized light is converted (phase-compensated) into linearly polarized light having a polarized plane coinciding with the transmission axis of the analyzer 113.

As a second solution, there has been proposed a liquid crystal display apparatus comprising a liquid crystal device, a relay optical system and an ocular optical system as shown in FIG. 3. More specifically, referring to FIG. 3, the system includes a liquid crystal device 121 comprising a nematic liquid crystal sandwiched between a pair of substrates and further provided with a polarizer, a field lens 122, a relay optical system 123, an intermediate image plane 125 functioning as an image plane for the relay optical system, an ocular optical system 126 for guiding an image on the intermediate imaging plane 125 to the pupil of a viewer, and an eye point 127.

In this system, an image displayed on the liquid crystal device 121 is passed through the field lens 122 and the relay optical system 123 to be focused on the intermediate image plane 125. The field lens 122 is disposed to form a telecentric system on the display face side and guides an outgoing light flux from the entire face of the liquid crystal device 121 to the relay optical system 123. The outgoing light flux includes principal rays (represented by axes A and B in FIG. 3) substantially perpendicular to the device substrates. A spatial image formed on the intermediate image plane 125 reaches the retina of a viewer to form an image thereon via the ocular optical system 126. Accordingly, the viewer observes the spatial image on the intermediate image plane 125 as a frontal virtual image.

In a conventional liquid crystal display apparatus according to this second solution, in case where the optical system is not made a telecentric system on the display face side, there result in different display contrasts between a central part and a peripheral part on the display face of the liquid crystal device due to the viewing angle-dependence of the liquid crystal. As a result, the image is accompanied with a display irregularity. Accordingly, it is essential that the optical system is telecentric on the display face side.

In a liquid crystal projector using a conventional liquid crystal display device, it is essential to effect a telecentric illumination. For this reason, a field lens may be disposed between the liquid crystal and a backlight as a third solution. A Fresnel lens may be used as the field lens so as to provide a light optical system and a short optical path.

However, in the first solution, the phase plate 112 has a constant retardation δ=Δnd over the entire surface so that the transmitted light is subjected to an identical phase modulation over the entire surface. As a result, in a liquid crystal device for color display, the phase compensation is liable to be insufficient. As shown in a characteristic view of FIG. 4, a liquid crystal and a phase plate show different retardation-wavelength characteristics, so that it is difficult to provide identical retardation for a liquid crystal and a phase plate for all wavelength regions used for display. As a result, in a liquid crystal device for color display, the phase compensation with a single phase plate allows an optimum phase compensation only at a specific wavelength (an intersection in FIG. 4). In other words, only inadequate phase compensation is effected for most of wavelength regions used for display.

The second solution is accompanied with a difficulty that the indispensably used field lens provides an optical system having a longer optical path and hinders the realization of a light-weight liquid crystal apparatus.

The third solution including the use of a Fresnel lens is accompanied with a problem that it is difficult to obtain good optical characteristics.

Next, a description will be made on an active matrix-type liquid crystal device according to the TN-mode.

An active matrix-type liquid crystal device wherein each pixel is provided with a transistor, has many advantageous features, such that it provides a thin display panel and allows a contrast display, so that it is expected to be widely used for various applications, such as display devices and liquid crystal shutters.

Herein, the term "pixel" is used to mean a minimum element of effective optical modulation so that one whole color display element can include a set of pixels of R, G and B. For example, a pixel means a region corresponding to a pixel electrode provided with a transistor in an active matrix-type and a region formed by an overlapping portion of electrodes formed on a pair of substrates in a simple matrix-type liquid crystal device.

Hereinbelow, an exemplary structure of an active matrix-type liquid crystal device is described with reference to drawings.

FIG. 5 is a partial plan view for illustrating an outline of a pixel of an active matrix-type liquid crystal device. Referring to FIG. 5, a pixel is constituted by a pixel electrode 300 surrounded by transistor drive lines 301 (referred to as "gate line(s)") and pixel voltage application lines 302 (referred to as "source line(s)" respectively connected to a transistor 303, which may for example be a TFT (thin film transistor).

FIG. 6 is a corresponding sectional view of a pixel taken along a line parallel to a source line. Referring to FIG. 6, the device includes a pixel electrode 300, a gate line 301, a polarizer 310, an analyzer 311, glass substrates 312 and 313, a color filter 314, a liquid crystal layer 315, and a counter electrode 316. The color filter 314 can of course be omitted if the device is used for a monochromatic optical modulation.

By turning on or off the transistor 303 based on a signal from the gate line 301, a voltage from the source line 302 is applied to the pixel electrode 300, whereby an electric field occurring between the pixel electrode 300 and the counter electrode 316 is applied across the liquid crystal layer 315 to effect optical modulation.

In an ordinary active matrix-type liquid crystal device, the source line 302 and/or the gate line 301 is disposed in the vicinity of the pixel electrode 300. As a result, the liquid crystal in a pixel is laterally supplied with an electric field between the pixel electrode 300 and the gate line 301 and also an electric field between the pixel electrode 300 and the source line 302 in addition to the electric field between the pixel electrode 300 and the counter electrode 316. Hereinafter, an electric field (or voltage) laterally applied to a pixel electrode (or liquid crystal) is called a lateral electric field (or voltage).

Disturbance in pretilt angle and twist angle caused by alignment distortion of liquid crystal molecules in a pixel due to such a lateral electric field has been reported in Proc. 10th Int. Display Research Conf. p. 248 (1990), and J. J. Appl. Phys., Vol. 29, No. 10, L1859–L1855 (1990). The phenomenon is called "disclination" and has caused light leakage in the non-transmissive (black display) state to result in bright lines in a pixel, thereby deteriorating the performances of a liquid crystal device, particularly the display performances of a liquid crystal display device.

In order to suppress the adverse effect of the phenomenon, it has been proposed to confine the disclination region to the peripheral portion of a pixel by increasing the pretilt angle as disclosed in Preprint for Liquid Crystal Forum, Lecture No. 4F101, p. 284 (1991).

However, an increased pretilt angle is accompanied with an inferior viewing angle characteristic and a dull threshold characteristic, thus lowering the performances of the liquid crystal device per se.

Further, even if the disclination region is confined to the peripheral portion of a pixel, the occurrence of bright lines per se cannot be avoided, so that the region where bright lines occur is ordinarily masked to make the region not noticeable. As a result, the aperture ratio is lowered to provide a lower transmittance of the liquid crystal device. This has provided a difficulty in providing a liquid crystal display device of a high brightness.

SUMMARY OF THE INVENTION

In view of the above-mentioned problems, a principal object of the present invention is to provide a liquid crystal device and a liquid crystal apparatus capable of optical modulation free from irregularity. More specifically, the present invention aims at providing a liquid crystal display device and a liquid crystal display apparatus which provide display images with excellent contrast and viewing angle characteristic and allow a compact optical system.

A second major object of the present invention is to provide a liquid crystal device and a liquid crystal apparatus wherein an adverse effect of disclination is suppressed. More specifically, the present invention aims at providing a liquid crystal device having an increased aperture ratio and a liquid crystal display device of a high brightness, wherein the occurrence of bright lines adversely affecting the display is suppressed.

According to the present invention, there is provided a liquid crystal device, comprising a pair of substrates and a liquid crystal disposed between the substrates; further including an optical member having a planar extension in parallel with the substrates and a non-uniform optical anisotropy, as represented by a refractive index anisotropy suitable for providing, e.g., a phase difference, along the planar extension.

As a result, an optimum optical phase compensation can be realized in a plane parallel with the substrates of the liquid crystal device, thus allowing an optical modulation free from irregularity. Further, the contrast and viewing angle characteristic of display images can be improved.

Preferably, the liquid crystal device according to the present invention is equipped with plural color filters having different transmitted light spectra, and the optical member is provided with an optical anisotropy distribution corresponding to each of the plural color filters so as to allow ideal phase compensation for each color filter.

In a preferred embodiment of the liquid crystal device according to the present invention, the optical member is provided with a distribution of optical anisotropy which varies from its central part to the periphery. As a result, the liquid crystal device is allowed to exhibit a viewing angle characteristic adapted to the optical system, so that the optical system can be made compact without using a telecentric optical system.

According to another aspect of the present invention, there is provided a liquid crystal device, comprising a pair of substrates and a liquid crystal disposed between the substrates so as to form a matrix of pixels, and further including an optical member having a planar extension parallel to the substrates and divided into regions, each region corresponding to a pixel and having a non-uniform optical anisotropy in the planar extension.

As a result, an adverse effect of disclination is suppressed and it becomes possible to realize a liquid crystal device having an increased aperture ratio and a high-luminance liquid crystal display device.

According to still another aspect of the present invention, there is provided a liquid crystal device, comprising a pair of substrates and a liquid crystal disposed between the substrates so as to form a matrix of pixels, and further including an optical member disposed locally in a region corresponding to a pixel.

As a result, an adverse effect of disclination is suppressed and it becomes possible to realize a liquid crystal device having an increased aperture ratio and a high-luminance liquid crystal display device.

According to the present invention, there is also provided a liquid crystal apparatus, comprising a liquid crystal device as described above, and a drive means for driving the liquid crystal device.

According to another aspect of the present invention, there is provided a liquid crystal apparatus comprising a liquid crystal device as described above and a projection optical system for projecting emitted light from the liquid crystal device onto a projection panel to form an image on the projection panel, wherein the optical member in the liquid crystal device has an optical anisotropy distribution corresponding to an angle between a principal ray in a light flux guided from the liquid crystal panel to the projection optical system and a normal to the substrates of the liquid crystal device.

As a result, an image formed by the liquid crystal device is enlarged and projected by the projection optical system, and the liquid crystal device is provided with a viewing angle characteristic suitable for the characteristic of the optical system, so that a telecentric optical system can be omitted to provide a compact optical system.

According to a further aspect of the present invention, there is provided a liquid crystal apparatus, comprising a liquid crystal device as described above, a relay optical system for receiving emitted light from the liquid crystal panel and forming a spatial image based on the emitted light, and an ocular optical system for observing the spatial image as a virtual image; wherein the optical member in the liquid crystal device has an optical anisotropy distribution corresponding to an angle between a principal ray in a light flux guided from the liquid crystal panel to the relay optical system and a normal to the substrates of the liquid crystal device.

As a result, an image formed by the liquid crystal device can be recognized in an arbitrary size, and the liquid crystal device is provided with a viewing angle characteristic suitable for the characteristic of the optical system, so that a telecentric optical system can be omitted to provide a compact optical system.

In the liquid crystal device according to the present invention, it is possible to use various liquid crystals, such as a nematic liquid crystal and a chiral smectic liquid crystal.

The liquid crystal device may be driven, e.g., according to a simple matrix scheme or an active matrix scheme.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A and 1B are schematic sectional views for illustrating an operation of a TN-mode liquid crystal device, wherein FIG. 1A shows a state under no voltage application and FIG. 1B shows a state under voltage application.

FIG. 2 is a schematic exploded view of a TN-mode liquid crystal device.

FIG. 3 is a schematic system illustration of a liquid crystal apparatus including a relay optical system and an ocular optical system.

FIG. 15A and 16A are respectively a schematic plan view of a planar distribution phase plate according to the invention, and FIGS. 15B and 16B are sectional views corresponding respectively thereto.

FIG. 17A is a schematic plan view of a planar distribution phase plate comprising a laminate of a retardation film and an isotropic medium, and FIG. 17B is a sectional view corresponding thereto.

FIGS. 18A and 18B are views for illustrating the viewing angle-dependence of a representative liquid crystal apparatus, wherein FIG. 18A illustrates definitions of θ and ψ, and FIG. 18B illustrates equi-contrast curves.

FIG. 19A is a schematic plan view of a planar distribution phase plate provided with a phase distribution corresponding to the viewing angle-dependence shown in FIGS. 18A and 18B, and FIG. 19B is a corresponding sectional view.

FIG. 21A is a schematic plan view of a planar distribution phase plate having an asymmetrical phase distribution according to the invention, and FIG. 21B is a corresponding sectional view.

FIG. 22 is a schematic sectional view of a schematic crystal device according to a fifth embodiment of the invention, and FIG. 23 is a schematic sectional view of a phase plate used therein.

FIGS. 25A and 25B illustrate behaviors of light incident to a liquid crystal device according to a fifth embodiment of the invention, wherein FIG. 25A illustrates a behavior of light incident to a non-transmissive (black display) part, and FIG. 25B illustrates a behavior of light incident to a bright line portion.

FIGS. 28A and 28B illustrate behaviors of light incident to a liquid crystal device according to a sixth embodiment of the invention, wherein FIG. 28A illustrates a behavior of light incident to a non-transmissive (black display) part, and FIG. 28B illustrates a behavior of light incident to a bright line portion.

FIGS. 31A and 31B illustrate behaviors of light incident to a liquid crystal device according to a seventh embodiment of the invention, wherein FIG. 31A illustrates a behavior of light incident to a non-transmissive (black display) part, and FIG. 31B illustrates a behavior of light incident to a bright line portion.

DESCRIPTION OF THE PREFERRED EMBODIMENTS (First Embodiment)

Figure 7:
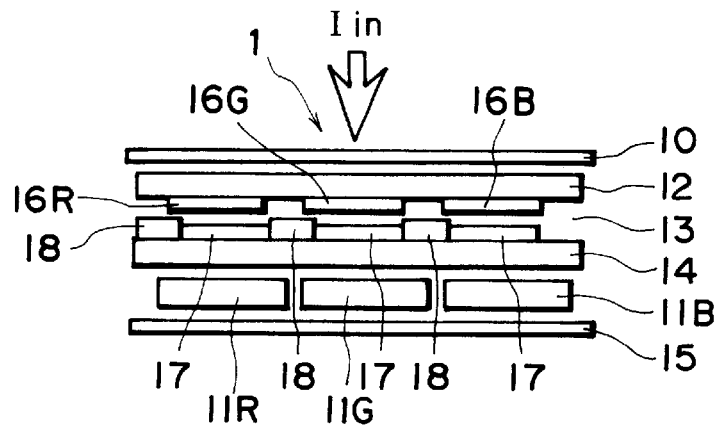
FIG. 7 is a schematic sectional view of a liquid crystal device according to a first embodiment of the invention.

FIG. 7 is a schematic sectional view of an embodiment of the liquid crystal device according to the present invention for one whole color display element including pixels of R, G and B.

Referring to FIG. 7, a liquid crystal device 1, which is an active matrix type liquid crystal device having a plurality of pixels arranged in a matrix, includes a polarizer (polarizer) 10 on an incident light side, i.e., receiving incident light Iin a pair of glass substrates 12 and 14, a liquid crystal layer 13 sandwiched between the substrates 12 and 14, color filters 16R, 16G and 16B transmitting red, green and blue light, respectively, an outgoing (emission) side polarizer (analyzer) 15, pixel electrodes 17, drive electrodes 18 for driving the pixels, and a phase plate 11R (for red), a phase plate 11G (for green) and a phase plate 11B (for blue) corresponding to the color filters 16R, 16G and 16B, respectively. In addition to the above, the liquid crystal device may include an alignment film, a counter electrode, etc., which have been however omitted from showing in FIG. 7.

The phase plates 11R, 11G and 11B disposed inside the analyzer 15 constitute an optical member having a non-uniform optical anisotropy in its planar extension in parallel with the substrates of the liquid crystal device 1 and are disposed in alignment with the color filters 16R, 16G and 16B, respectively. Such a phase plate may be produced by subjecting a sheet of a plastic material, such as polycarbonate, polystyrene or polyamide to a treatment such as compression or stretching to provide the sheet with an orientation birefringence (optical anisotropy). In this instance, the conditions for the compression, stretching, etc. are controlled to provide a planar distribution phase plate corresponding to each color filter. Ordinarily, a color filter (segment) is disposed for each pixel so as to have a generally rectangular shape with a side length of ca. 50–300 $\mu$m. Accordingly, the phase plates 11R, 11G and 11B have to be patterned according to a fine patterning process, which may for example be sputtering, photolithography or etching. In addition, it is also possible to use another process, such as scribing by a cutting apparatus or UV forming.

The liquid crystal layer may be subjected to an alignment according to representatively a TN-mode or may be another mode, such as a super-twist alignment mode. The liquid crystal 13 may comprise a nematic liquid crystal but may also comprise another liquid crystal, such as a chiral smectic liquid crystal. This embodiment shown in FIG. 7 per se refers to an active matrix-type liquid crystal device but a simple matrix type or another type of liquid crystal device may also assume a similar structure.

Now, an operation of the embodiment of the liquid crystal device shown in FIG. 7 will be described. Incident light Iin from a light source such as a backlight (not shown) entering the liquid crystal device 1 is converted by the polarizer 10 into linearly polarized light, which passes through the glass substrate 12 to enter the liquid crystal layer 13 while being separated into three colors of red, green and blue by the red-transmission filter 16R, green-transmission filter 16G and blue-transmission filter 16B, respectively. The respectively colored linear polarized light are phase-modulated by birefringence owing to the liquid crystal molecular alignment in the liquid crystal layer 13 to be converted into respective polarized states.

The respective colored lights transmitted through the liquid crystal layer 13 are subjected to respectively prescribed phase compensation, i.e., the red transmitted light by the phase plate 11R for red, the green transmitted light by the phase plate 11G for green, and the phase plate 11B for blue. Then, each polarized light subjected to the phase compensation is converted into linear polarized light by the analyzer 15 and discharged as an emitted light from the pixel. In case where the liquid crystal device is used as a display device, the emitted light forms a display image in combination with emitted light from the other pixels.

Red transmission filter, green transmission filter and blue transmission filter ordinarily used in a color liquid crystal device have central wavelengths in the vicinity of ca. 650 nm, 550 nm and 450 nm, respectively. Ideally, the phase plates 11R, 11G and 11B shown in FIG. 7 effects phase compensation optimum for the central wavelengths of the respective color transmission filters. Practically good performances may be attained if the phase plates 11R, 11G and 11B effect optimum compensation for any wavelength in the ranges of 650±10 nm, 550±10 nm and 450±10 nm, respectively.

As described above, in this embodiment, outgoing light from the liquid crystal layer 13 is phase-compensated to correct the phase modulation due to the birefringence of the liquid crystal and the phase compensation is effected for respective transmitted light through the respective color transmission filters, whereby the phase compensation can be effected so as to be optimum for the central wavelengths of the respective color transmitted lights, thus realizing an irregularity-free optical modulation. As a result, if the liquid crystal device is used as a display device, the contrast and viewing angle characteristic of display images can be remarkably improved.

Figure 8:
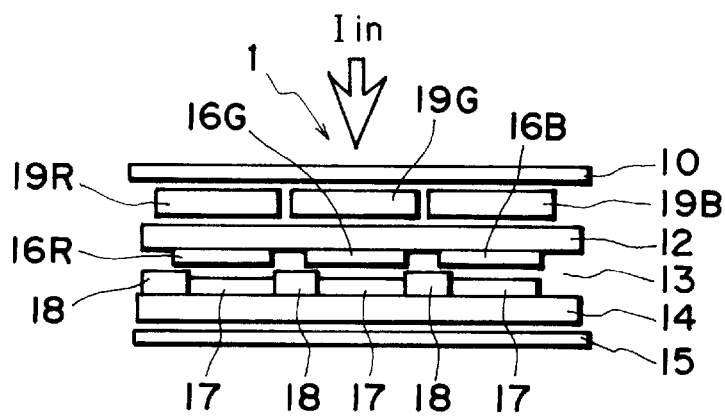
FIG. 8 shows a modification thereof.

FIG. 8 is a schematic sectional view showing a modification of the embodiment of FIG. 7. In this modified embodiment, a phase plate 19R for red, a phase plate 19G for green, and a phase plate 19B for blue corresponding to the respective color transmission filters 16R, 16G and 16B are disposed between the polarizer 10 and the glass substrate 12.

Accordingly, in this modified embodiment, incident-side polarized light is phase-modulated optimum for the central wavelengths of the respective colored transmitted light when the polarized light passes through the phase plates in advance of passing through the liquid crystal layer 13, and the phase modulated light is then passed through the respective color transmission filters.

The phase plates 11R, 19R, etc., as phase-compensation means, may also be subjected to corrections with respect to central wavelengths determined corresponding to the spectral distribution of a light source, such as a backlight, instead of a correction means determined corresponding to the spectral sensitivities of transmission filters described above.

(Second Embodiment)

In this embodiment, a plurality of phase plates for phase compensation are disposed on an identical optical path.

Figure 9:
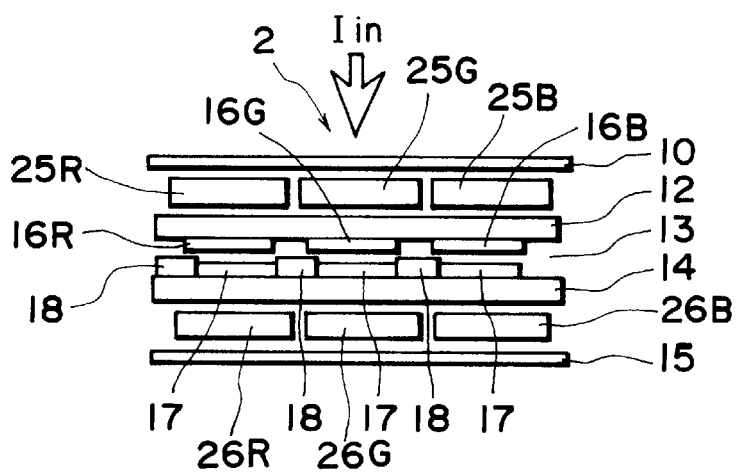
FIG. 9 is a schematic sectional view of a liquid crystal device according to a second embodiment of the invention.
Figure 10:
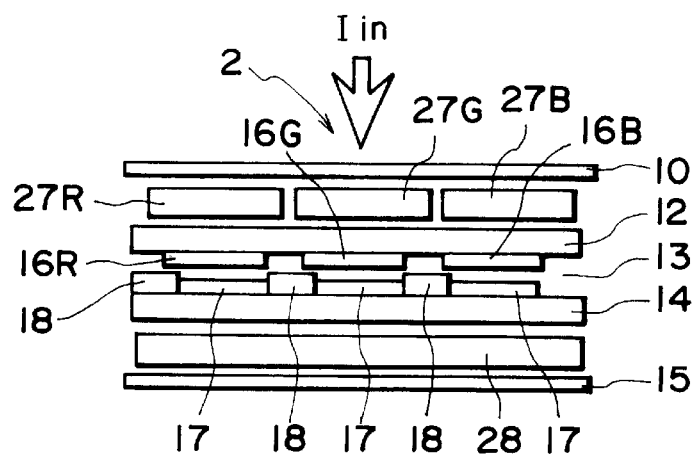
FIG. 10 shows a modification thereof.

FIG. 9 is a schematic sectional view of a liquid crystal device according to this embodiment, and FIG. 10 is a schematic sectional view of a liquid crystal device according to a modification thereof.

In the embodiment shown in FIG. 9, phase plates 25R, 25G and 25B for respective colors corresponding to respective colors of red, green and blue pixels are disposed on an incident side of a liquid crystal device 2 and, also on the emission side, phase plates 26R, 26G and 26B for respective colors are disposed. In the modification shown in FIG. 10, phase plates 27R, 27G and 27B for respective colors are disposed on the incident side, and a common phase plate 28 is disposed on the emission side. Contrary to the arrangement shown in FIG. 10, it is also possible to dispose a common phase plates for respective colors on the emission side. It is further possible to dispose phase plates for respective colors either on the incident side or the emission side and further dispose phase plates for respective colors or a common phase plate on the same side.

By using plural phase plates as in this embodiment, the latitude of designing is enlarged to allow a further optimized optical compensation.

(Third Embodiment)

A liquid crystal apparatus according to this embodiment includes a relay optical system and an ocular optical system.

Figure 11:
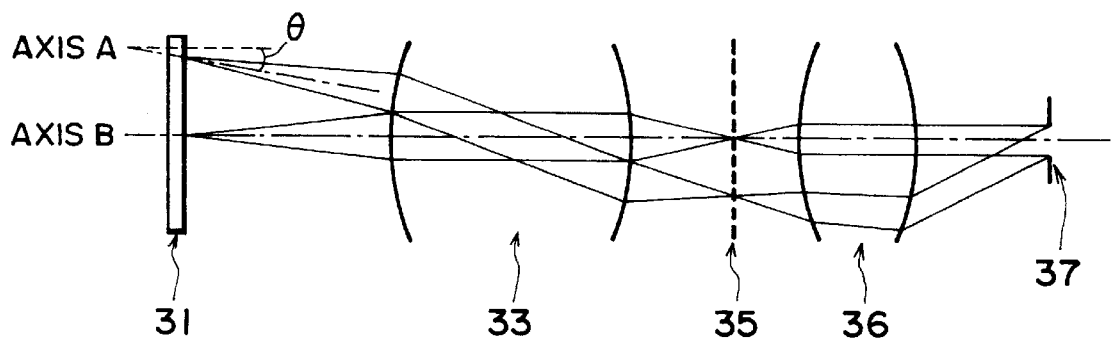
FIG. 11 is a schematic side illustration of an optical system for a liquid crystal apparatus according to a third embodiment of the invention.

FIG. 11 is a schematic illustration of an optical system for such a liquid crystal apparatus.

Referring to FIG. 11, the optical system includes a liquid crystal device 31, a relay optical system 33, an intermediate image plane 35 functioning as an image plane for the relay optical system 33, an ocular optical system 36 for guiding an image on the intermediate image plane to the pupil of a viewer at an eye point 37.

In the optical system shown in FIG. 11, an image displayed on a liquid crystal device 31 is image-formed on the intermediate image plane by the relay optical system 33. In this instance, principal rays (denoted by, e.g., an axis A forming an angle θ (≠0) and an axis B forming an angle θ(=0), respectively with respect to a normal to the liquid crystal device surface in FIG. 11) forming central lines of emission flux from the liquid crystal device 31 are guided at an angle of θ with respect to a normal to the substrate surface of the liquid crystal device 31 to the relay optical system 33. A spatial image formed on the intermediate image plane 35 is observed as a virtual image by a viewer. By appropriately modifying the characteristics of the relay optical system 33 and the ocular optical system 36, the viewer can recognize the image on the liquid crystal device 31 at an arbitrary size.

Figure 12:
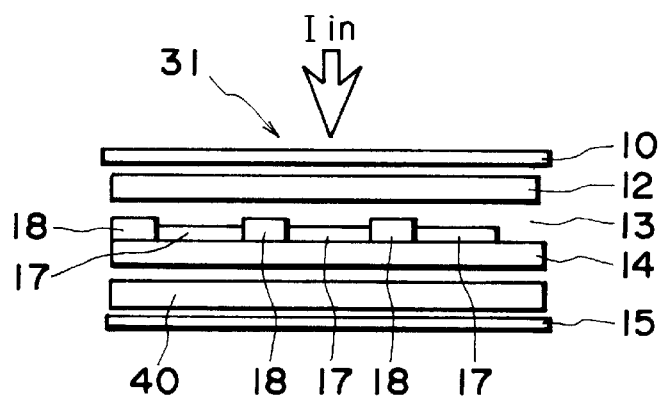
FIG. 12 is a schematic sectional view of a liquid crystal device used therein.

FIG. 12 is a schematic sectional view of a liquid crystal device according to this embodiment.

As shown in FIG. 12, the liquid crystal device 31 includes a polarizer 10, a liquid crystal layer 13, glass substrates 12 and 14 sandwiching the liquid crystal layer 13, pixel electrodes 17 composed of transparent electrodes, drive electrodes 18 for driving pixels, and a planar distribution phase plate (optical member) 40 having a phase distribution varying along its planar extension and providing a locally varying optical modulation effect to light transmitted therethrough. Other members, such as an alignment film and a counter-electrode, may be further included but are omitted from showing in FIG. 12. The planar distribution phase plate 40 has such a two-dimensional phase distribution as to allow phase compensation depending on an angle θ between a principal ray from the liquid crystal device 31 and a normal to the liquid crystal device 31.

Now, an operation of the above-mentioned liquid crystal apparatus will be described. Incident light Iin entering the liquid crystal device 31 is converted by the polarizer 10 into linearly polarized light and transmitted through the glass substrate 12 to enter the liquid crystal layer 13. The light transmitted through the liquid crystal layer 13 is subjected to phase compensation by the planar distribution phase plate to provide a viewing angle characteristic such that a contrast of emission light becomes maximum in a θ direction, i.e., a principal ray direction, depending on the angle θ between a principal ray guided from the liquid crystal device 31 to the relay optical system 33 and a normal to the substrate surface of the device 31. Then, the emission light is converted into linear polarized light by the analyzer 15 to form emitted light corresponding to the pixel, which in combination with emitted light from the other pixels to form an image. Herein, θ depends on a positional relationship between the liquid crystal device 31 and the relay optical system 33.

According to this embodiment, the contrast on the liquid crystal device 31 observed by a viewer can be made substantially uniform from the center to the periphery and provide a maximum contrast of the liquid crystal device 31. As a result, it becomes unnecessary to dispose a field lens, so that the optical path of the optical system is shortened, and good quality images free from irregularity can be obtained.

(Fourth Embodiment)

A liquid crystal apparatus according to this embodiment includes a projection optical system as used for a liquid crystal projector.

Figure 13:
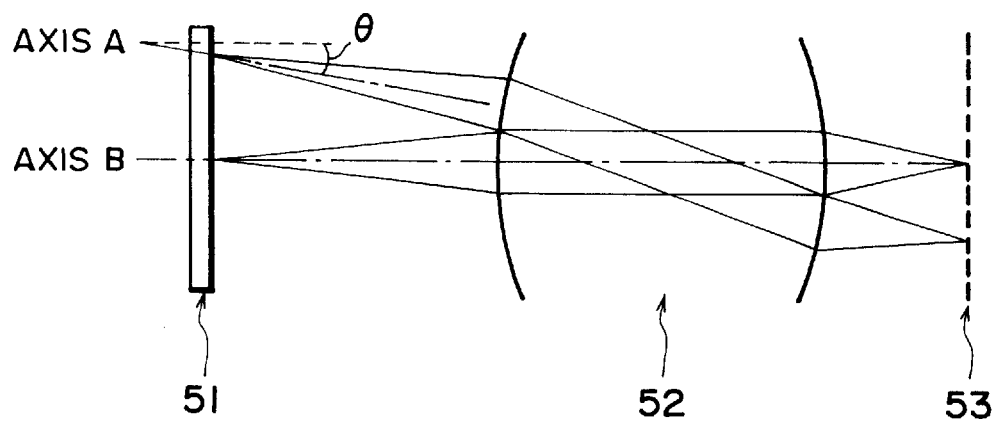
FIG. 13 is a schematic side illustration of an optical system for a liquid crystal apparatus according to a fourth embodiment of the invention.

FIG. 13 is a schematic illustration of an optical system for such a liquid crystal apparatus.

Referring to FIG. 13, the optical system includes a liquid crystal device 51, a projection optical system 52 and a projection panel 53. In the optical system shown in FIG. 14, an image displayed on the liquid crystal device 51 is enlarged by the projection optical system 52 and image-formed (projected) on the projection panel 53.

Similarly as in the above-described third embodiment, principal rays (denoted by axes A and B in FIG. 13) forming central lines of emission flux from the liquid crystal device 51 are guided at an angle θ with respect to a normal to the substrate surface of the liquid crystal device 51 to the projection optical system 52. An image formed on the projection panel is observed by a viewer. By appropriately modifying the characteristics of the projection optical system 52, the viewer can recognize the image on the liquid crystal device 51 at an arbitrary size.

Figure 14:
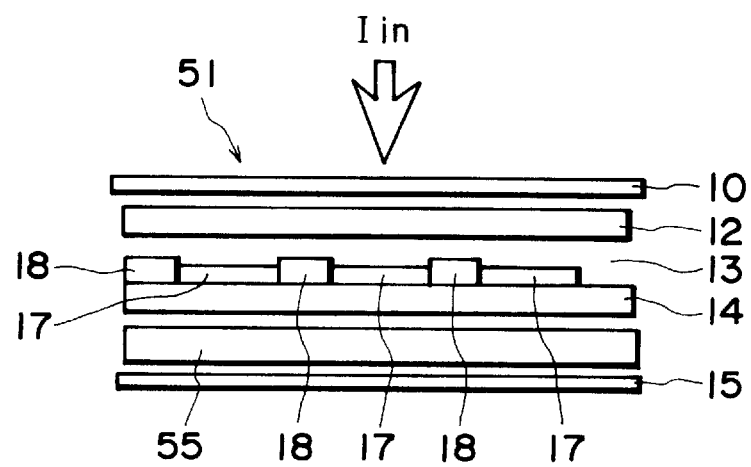
FIG. 14 is a schematic sectional view of a liquid crystal device used therein.

FIG. 14 is a schematic sectional view of a liquid crystal device according to this embodiment.

As shown in FIG. 14, the liquid crystal device 51 according to this embodiment has a structure similar to the liquid crystal device 31 shown in FIG. 12 according to the third embodiment. However, θ in FIG. 13, depends on a positional relationship between the liquid crystal device 51 and the projection optical system 52, etc. Accordingly, a planar distribution phase plate 55 having a phase distribution different from that of the planar distribution phase plate 40 shown in FIG. 12. Detailed structures of such planar distribution phase plates will be described later.

According to this embodiment, the image on the liquid crystal device 51 can be made substantially uniform from the center to the periphery with respect to its contrast and projected at a maximum contrast of the device 51 onto the projection panel. Thus, good quality images can be formed at a high contrast and without irregularity. Further, a field lens can be omitted from the optical system to shorten the optical path thereof, thus shortening the distance between the liquid crystal device 51 and the projection panel.

(Description of planar distribution phase plate)

Some specific structural examples of the planar distribution phase plates 40 and 55 used in the above-described third and fourth embodiments will now be described with reference to FIGS. 15–17 including FIGS. 15A–17A which are respectively a schematic plan view of a planar distribution phase plate and FIGS. 15B–17B which are corresponding sectional views.

FIGS. 15A and 15B show a planar distribution phase plate 40 (or 55) having a planar phase (difference) (e.g., retardation) distribution which varies concentrically from the center to the periphery. In FIG. 15A, each of circular curves 70–76 represents an equi-phase line. FIGS. 16A and 16B show a planar distribution phase plate 40 (or 55) having a planar phase distribution which varies in the form of concentric rectangles from the center to the periphery as represented by equi-phase curves 77–81.

In the embodiments shown in FIGS. 15 and 16, the planar phase (retardation) distribution of the phase plates 50 and 55 may be provided in the form of a difference in refractive index Δn or by changing a uniaxial or biaxial optical axis thereof. The planar phase distribution may be continuous or stepwise.

Such a planar distribution phase plate 40 or 55 may be produced by subjecting a sheet of a transparent plastic material, such as polycarbonate, polystyrene or polyamide to a treatment, such as compression or stretching to cause an orientation birefringence in the sheet. A desired planar distribution may be provided by controlling the conditions for the compression, stretching, etc. Alternatively, it is also possible to effect a patterning as by photolithography similarly as in the first embodiment.

FIGS. 17A and 17B are a schematic plan view and a sectional view, respectively, of a planar distribution phase plate 40 or 55 comprising an isotropic medium and retardation films (optical member) 44–48 each having a uniform retardation. As in this embodiment, a phase plate having a non-uniform phase distribution as a whole may be constituted by laminating a plurality of retardation films of different areas each having a uniform retardation. In the structure shown in FIGS. 17A and 17B, it is preferred that the isotropic medium 43 and the retardation films 44–48 have as close a refractive index as possible so as to avoid the occurrence of scattered light from the film edges, etc.

Now, the viewing angle-dependence of a typical liquid crystal apparatus with no phase compensation will be described with reference to FIGS. 18A and 18B.

FIG. 18A, ψ denotes an angle between the projection 62 of emission light from a liquid crystal device 60 onto the device surface and a reference linear line LL prescribed in advance on the device surface and θ denotes an angle between the emission light direction 62 and a normal to the device surface.

FIG. 18B shows equi-contrast lines 65–68 on a circular graph having a circumferential scale of ψ and a radial scale of θ with units of degrees, respectively. The equi-contrast lines 65–68 represent a lower contrast as the number thereof increases.

It is preferred that the equi-contrast lines are close to circles. However, as is shown in FIG. 18B, the equi-contrast lines are close to vertically shrinked ovals (having a long axis/short axis ratio of ca. 2/1). In other words, there is a viewing angle-dependence such that the contrast remarkably varies depending on the values of ψ.

FIGS. 19A and 19B are a schematic plan view and a sectional view, respectively, of a phase plate 40 or 55 having a phase distribution corresponding to the viewing angle-dependence shown in FIG. 18B. Curves 85–88 shown in FIG. 19A represent equi-phase curves.

Figure 20A:
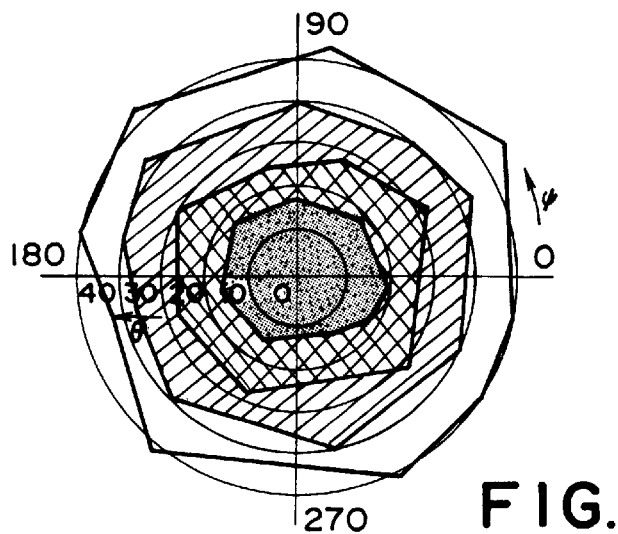
FIGS. 20A, 20B and 20C are views showing equi-contrast curves for illustrating viewing angle-dependences phase-compensated at points A, B and C, respectively, in FIG. 19B.
Figure 20B:
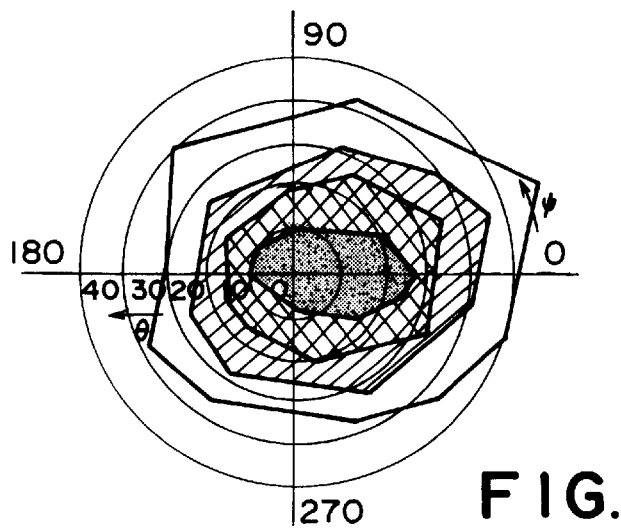
Figure 20C:
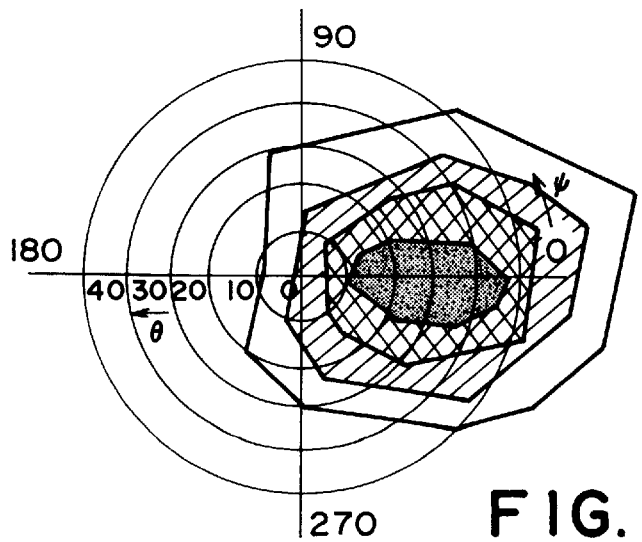

The liquid crystal device 60 is provided with the phase plate to effect phase compensation. The viewing angle characteristics of the liquid crystal device after the phase compensation at points A, B and C of FIG. 19A are shown in FIGS. 20A, 20B and 20C, respectively.

In this way, good images free from irregularity can be obtained by effecting phase compensation with respect to viewing angle-dependence depending on the angle θ between principal rays of emission light flux from a liquid crystal device and a normal to the liquid crystal device.

It is also possible to provide a phase plate with a phase distribution which is asymmetric vertically and/or laterally as shown in FIGS. 21A (schematic plan view) and 21B (sectional view), depending on the characteristic of an objective liquid crystal device. In these figures, curves 90–93 represent equi-phase curves.

In the above-described embodiments of liquid crystal devices, phase compensation is effected by using a phase plate having a phase distribution which is non-uniform in a plane parallel to the liquid crystal device. The liquid crystal device is not restricted to a transmission-type one but may be those of a reflection-type. Further, in the above, the liquid crystal device and apparatus for display have been principally disclosed but the liquid crystal device and apparatus for other purposes may also be applicable.

Hereinbelow, some preferred embodiments of a liquid crystal device according to the present invention including an optical member having a non-uniform optical anisotropy in a region for one pixel, will be described.

(Fifth embodiment)

FIG. 22 is a schematic sectional view of almost one pixel of a liquid crystal device according to the fifth embodiment of the present invention. The liquid crystal device 203 is an active matrix-type one including a plurality of pixels arranged in a matrix.

Referring to FIG. 22, the liquid crystal device 203 includes a pixel electrode 201 comprising a transparent electrode, a gate line 202, an incident side polarizer (polarizer) 210, an emission side polarizer (analyzer) 211, glass substrates 212 and 213, a color filter 214, a liquid crystal layer 215, a counter electrode 216 comprising a transparent electrode and a phase plate (optical member) 220. FIG. 22 shows a section parallel to a source line and perpendicular to the gate line 202. Incident light Iin enters the device 203 downwardly. A coordinate system as indicated may be formed by taking an X-axis perpendicularly to the drawing from the front surface to the back surface and parallel to the gate line, a Y-axis directed rightward on the drawing and parallel to the source line, and a Z-axis directed downward on the drawing. Thus, the X-axis and Y-axis are taken on a plane parallel to the glass substrates 212 and 213 (i.e., a plane parallel to a display surface when the device is used for display), and the Z-axis is taken in a direction perpendicular to the glass substrates and directed from the light incidence side to the emission side.

The liquid crystal in the liquid crystal layer 215 may representatively be aligned in a twist mode but may also be aligned in a super-twist mode or another mode. The liquid crystal may representatively comprise a nematic liquid crystal but may also comprise another liquid crystal, such as a chiral smectic liquid crystal. When color transmitted light is not required, the color filter 214 can be omitted.

An operation of the embodiment of the liquid crystal device shown in FIG. 22 will be described.

Incident light Iin from a light source, such as a backlight (not shown), entering the liquid crystal device 203 is converted by the polarizer 210 into linearly polarized light, which passes through the glass substrate 212, is color-separated by the color filter 214 and enters the liquid crystal layer 215. The respectively colored polarized light is phase-modulated by birefringence owing to the liquid crystal molecular alignment in the liquid crystal layer 215 to be converted into respective polarized states.

Each colored light transmitted through the liquid crystal layer 215 is, after passing through the glass substrate 213, phase-compensated by the phase plate 220 depending on its polarized state and then converted into linearly polarized light by the analyzer 211 to be issued as emitted light corresponding to the pixel. The emitted light in combination with emitted light from other pixels forms an image in case where the liquid crystal device is used for display.

Now, phase compensation according to this embodiment will be described with reference to FIGS. 23–25.

FIG. 23 is a schematic plan view of a phase plate 220 as a preferred example of a phase plate for a liquid crystal device according to this embodiment. In FIG. 23 (as viewed from the emission side), the coordinate axes are taken corresponding to those shown in FIG. 22. The phase plate 220 may be produced in a similar manner as the planar distribution phase plate in the above-described first to fourth embodiments, i.e., by subjecting a sheet of a transparent plastic material, such as polycarbonate, polystyrene or polyamide, to a treatment such as compression or stretching to cause an orientation birefringence (optical anisotropy) in the sheet.

The phase plate 220 is formed to have a certain width d1 in a plane parallel to the substrates (i.e., pixels) in a rectangular region 219 (about one fourth of FIG. 23) corresponding to one pixel and has a shape of almost L extending from one peripheral side to another neighboring peripheral side of the rectangular region 219. The phase plate 220 may be formed in such a pattern by a method similar to one for forming an electrode pattern, e.g., sputtering, etching or photolithography. The phase plate 220 may be formed in situ on the glass substrate 211 (FIG. 22) or by applying a preliminarily patterned phase plate onto the glass substrate 211. An unevenness corresponding to the thickness of the phase plate 220 may be formed on the glass substrate 211 but this is practically of no problem because a phase plate formed of a material as described above is very thin. An unevenness-free phase plate will be described later in a sixth embodiment. The certain width d1 corresponds to the shape of a disclination and/or bright line occurring in a pixel and need not be constant while varying depending on the shape of the disclination and/or bright line.

Figure 24:
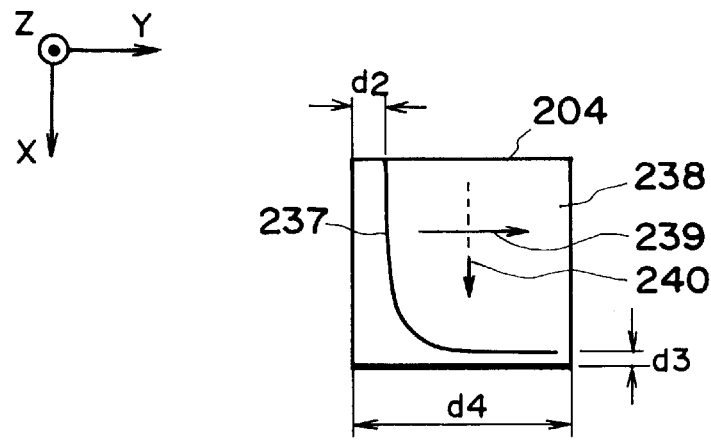
FIG. 24 is a schematic plan view for illustrating an ordinary manner of occurrence of bright lines.

An ordinary example of occurrence of a bright line corresponding to a disclination at the time of black display in a normally white display mode, is shown in FIG. 24, which is a schematic plan view as viewed from the emission side of a pixel 204 of a liquid crystal device formed by removing the phase plate 220 from the liquid crystal device 203 shown in FIG. 22. The coordinate axes are taken corresponding to those shown in FIG. 22. As shown in FIG. 24, due to the influence of the above-mentioned lateral electric field, a bright line 237 occurs in a black display portion 238. The liquid crystal device 204 used a liquid crystal in a twist alignment with an alignment direction 239 on the pixel electrode side and a rubbing direction 240 on the counter-electrode side. In this figure, the rubbing direction 239 on the pixel electrode side is parallel to the gate line and the rubbing direction 240 on the counter electrode side is parallel to the source line, but other rubbing directions are possible. However, the rubbing directions including the forwardness or the reverseness may affect the place of occurrence of bright lines.

Figure 4:
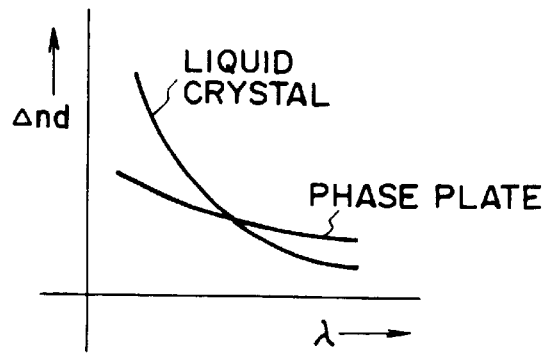
FIG. 4 is a graph showing a relation between retardation-wavelength characteristics of a liquid crystal and a phase plate.
Figure 5:
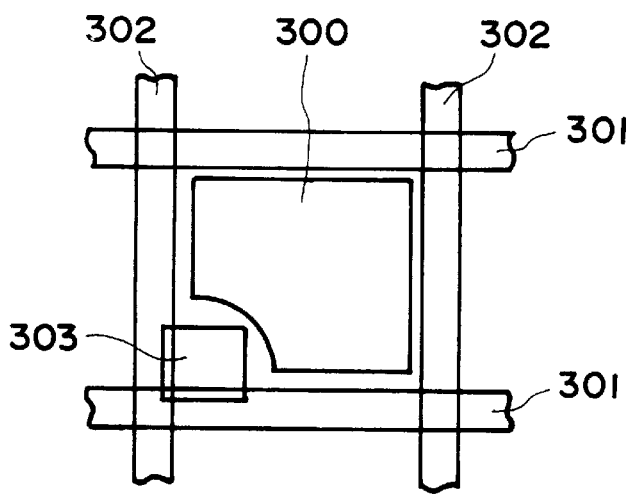
FIGS. 5 and 6 are a schematic plan view and a sectional view, respectively, of a pixel of an active matrix-type liquid crystal device.
Figure 6:
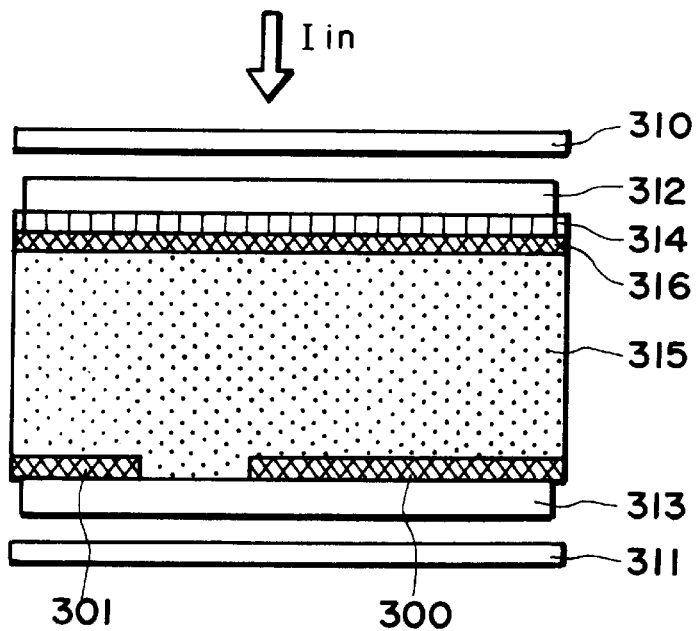

Now, some explanation is added with further reference to FIG. 5. In the above-described arrangement, the bright line occurs along two sides including a corner provided with a transistor therebetween, i.e., along the gate line 302 on the left side and the source line on the lower side. In FIG. 24, similarly as in FIG. 5, a transistor is disposed in the vicinity of a lower left corner of a rectangle corresponding to a pixel, the gate line is disposed along the side in the X-axis direction and the source line is disposed along the side in the Y-axis direction, while not shown therein. Similarly as in the case of FIG. 5, a bright line 237 occurs along the left side gate line and the lower side source line so as to be ca. d2 apart from the left side and ca. d3 apart from the lower side. The values of d2 and d3 are ca. 5–15% of one side length d4. The position of a bright line corresponding to a disclination is substantially determined by the rubbing direction and the magnitude of the lateral electric field.

Now, polarization states of the black display region and the bright line 237 are considered. As has been described with reference to FIG. 1B, the polarization axis of emitted light from a liquid crystal layer in a black display state is expected to be substantially perpendicular to the transmission axis of the analyzer 106. However, the alignment of the bright line portion of the liquid crystal layer is distorted by a lateral electric field. As a result, the light transmitted through the bright line portion is caused to contain a polarization light component parallel to the transmission axis of the analyzer to be partially transmitted through the analyzer, whereby the portion is recognized as a bright line to a viewer in the case of a liquid crystal display apparatus. Further, in a liquid crystal device for use other than display, the bright line portion fails to effect a prescribed optical modulation to lower the reliability.

Figures 25A, 25B:
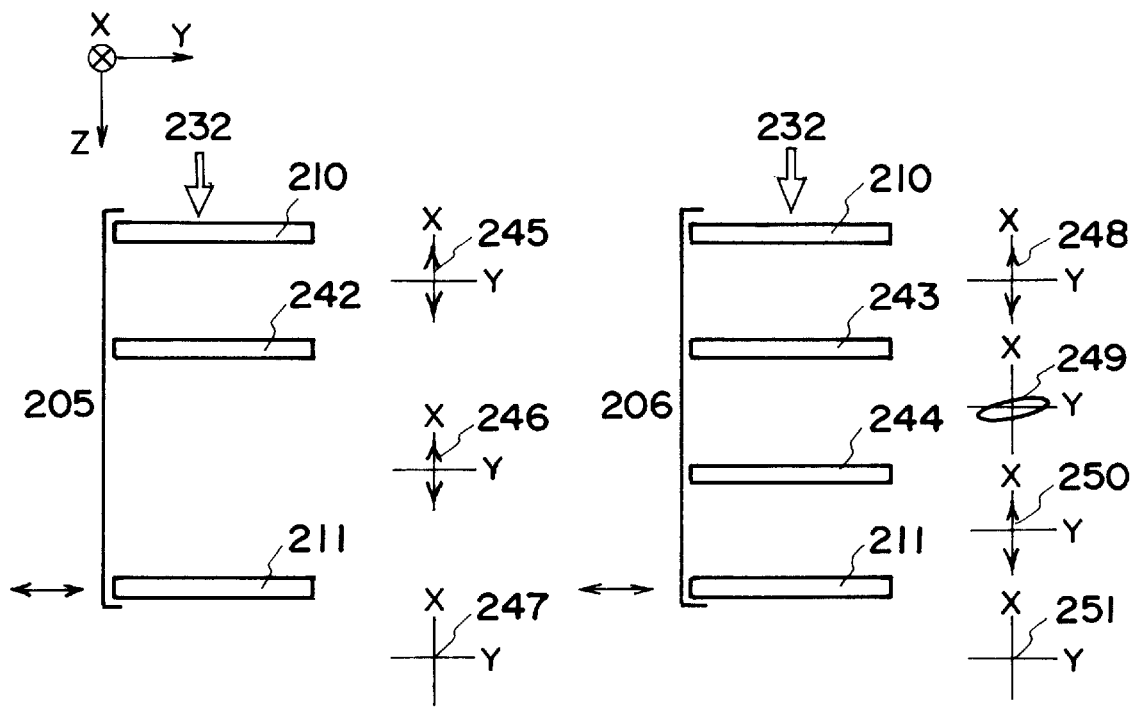

Now, the behavior of light incident to a black display region (pixel) and a bright line portion therein of the liquid crystal device 203 will be described with reference to FIG. 25A showing the behavior of light entering the black display region and FIG. 25B showing the behavior of light entering the bright line portion. In FIGS. 25A and 25B, numeral 205 roughly represents a section corresponding to a black display region of the liquid crystal device 203 and 206 roughly represents a section corresponding to a bright line portion of the liquid crystal device 203. Further, 210 denotes a polarizer having a transmission axis in the X-axis direction, and 211 denotes an analyzer having a transmission axis in the Y-axis direction. Numerals 242 and 243 represent portions in a liquid crystal layer from one substrate to the other substrate, 244 denotes a phase plate, and 245–251 represent polarization states in a plane parallel to the substrates.

Referring to FIG. 25A, incident light 232 having random polarization components is converted into linearly polarized light 245 by the polarizer 210. In the black display region, liquid crystal molecules in the liquid crystal layer are aligned substantially parallel to electric field between the pixel electrode and the counter-electrode, so that light passing through the liquid crystal layer is not substantially subject to optical rotation by liquid crystal molecules and light emitted through the emission side substrate becomes linearly polarized light 246 having a polarization axis substantially perpendicular to the transmission axis of the analyzer 211. As a result, the emitted light 247 from the analyzer 211 becomes substantially zero. For simplicity, the above-mentioned phase modulation by birefringence of liquid crystal is neglected for the time being. If desired, a phase plate may be designed as a combination of this embodiment and any of the first to fourth embodiments, and such an embodiment will be described hereinafter as a seventh embodiment.

Referring to FIG. 25B regarding a bright line portion, incident light 232 having random polarization components is converted by the polarizer 210 into linearly polarized light 248. At the bright line portion, the alignment of the liquid crystal layer is distorted by a lateral electric field as described above. As a result, emitted light through the emission side substrate 243 becomes elliptically polarized light 249 containing a polarized light component parallel to the transmission axis of the analyzer 211. If the retardation of the polarized light 249 is denoted by $\Delta$, the phase plate 244 is designed to provide a retardation $-\Delta$, so that the polarized light 249 is phase-compensated when it passes through the phase plate 244, to provide linearly polarized light 250 having a polarization axis substantially perpendicular to the transmission axis of the analyzer 211. As a result, the emitted light 251 from the analyzer 211 becomes substantially zero.

Thus, by compensating the phase of polarized light at a disclination with a phase plate, the occurrence of a bright line can be suppressed to prevent light leakage through the whole black display region of a liquid crystal device. Accordingly, it becomes unnecessary to provide a mask required conventionally, thus providing an increased aperture ratio. Particularly, in a liquid crystal display device, a high brightness and a high contrast can be realized to provide remarkably improved display performances.

(Sixth embodiment)

Figure 26:
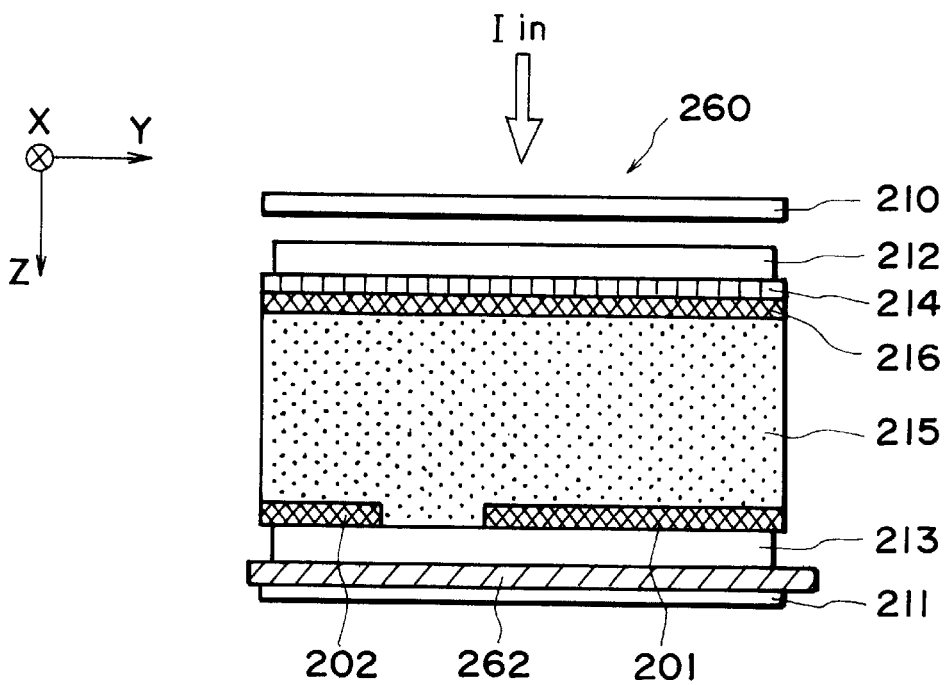
FIG. 26 is a schematic sectional view of a liquid crystal device according to a sixth embodiment of the invention.

FIG. 26 is a schematic sectional view of almost one pixel of a liquid crystal device according to the sixth embodiment of the present invention. The liquid crystal device 260 is an active matrix-type one including a plurality of pixels arranged in a matrix. In FIG. 26, members identical to those shown in FIG. 22 for the fifth embodiment are denoted by identical reference numerals, and the description thereof is omitted. The coordinate axes are taken in the same manner as in FIG. 22. The liquid crystal device shown in FIG. 26 includes a phase plate 262 according to this embodiment.

Figure 27A:
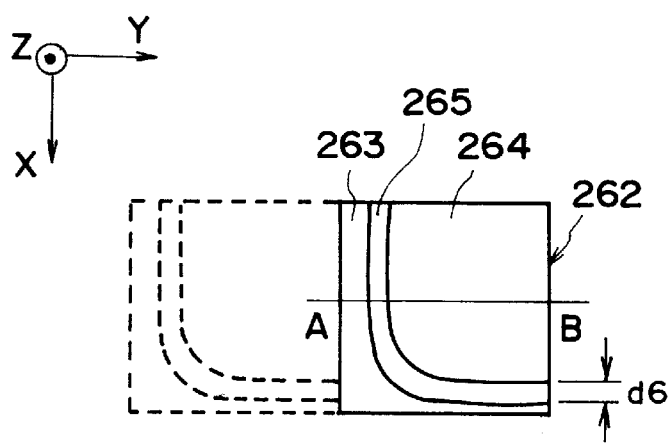
FIG. 27A is a schematic sectional view of a phase plate used therein.
Figure 27B:
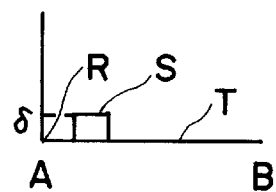
FIG. 27B is a retardation distribution along an A–B section thereof.

FIG. 27A is a schematic plan view of an example of the phase plate 262 according to this embodiment, and FIG. 27B is a graph sowing a retardation distribution of the phase plate 262 along an A-B line in FIG. 27A.

The phase plate 262 comprises members 263–265 of which the members 263 and 264 are optically isotropic optical members (isotropic member) and the member 265 is an optical member having a uniaxial or biaxial optical anisotropy (phase member).

As shown in FIG. 27A, the phase member 265 is formed to have a certain width d6 in a plane parallel to the substrates 212 and 213 of the liquid crystal device in a rectangular region corresponding to one pixel and has a shape of almost L extending from one peripheral side to another neighboring peripheral side of the rectangular region. The isotropic members 263 and 264 occupy the other portion of the rectangular region corresponding to one pixel. As shown in FIG. 27B, a region R corresponding to the isotropic member 263 and a region T corresponding to the isotropic member 264 are isotropic and therefore have a retardation of zero. A region S corresponding to the phase member 265 has a retardation $\delta$.

The phase member 265 may be produced in a similar manner as the phase plate in the first to fifth embodiments. The isotropic member 263 and 264 may be formed from a transparent plastic material, such as polycarbonate, polystyrene or polyamide so as not to cause orientation birefringence (optical anisotropy) and patterned by sputtering, photolithography, etc. Alternatively, an isotropic sheet of such a transparent plastic material may be locally selectively subjected to a treatment, such as compression or stretching to provide the phase member 265 integral with the isotropic members 263 and 264. The above-mentioned certain width d6 corresponds to the shape of a disclination and/or a bright line occurring in a pixel and need not be constant while varying depending on the shape of the disclination and/or bright line.

Figure 28A:
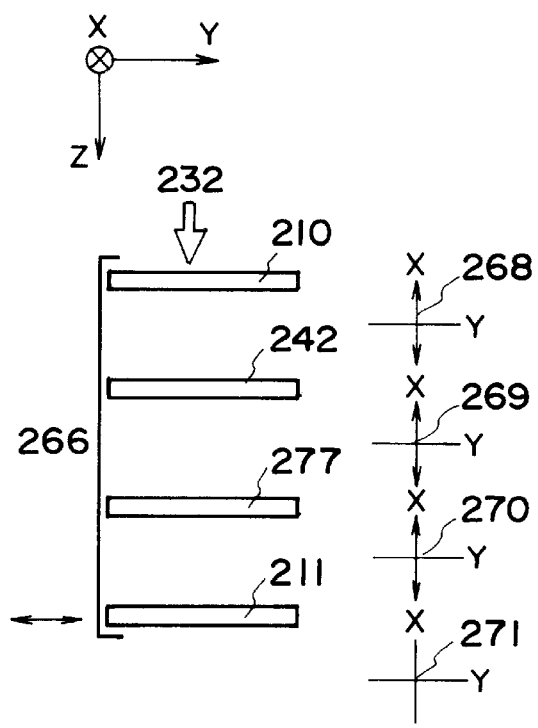
Figure 28B:
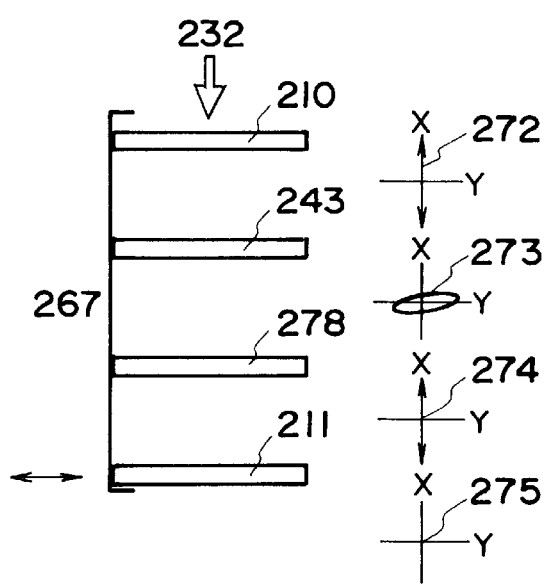

Now, the behavior of light incident to a black display region (pixel) and a bright line portion therein of the liquid crystal device 260 according to this embodiment will be described with reference to FIG. 28A showing the behavior of light entering the black display region and FIG. 28B showing the behavior of light entering the bright line portion. In FIGS. 28A and 28B, numeral 266 roughly represents a section corresponding to a black display region of the liquid crystal device 260, and 267 roughly represents a section corresponding to a bright line portion of the liquid crystal device 260. Further, 210 denotes a polarizer having a transmission axis in the X-axis direction, and 211 denotes an analyzer having a transmission axis in the Y-axis direction. Numerals 242 and 243 represent portions in a liquid crystal layer from one substrate to the other substrate, 277 and 278 denote an isotropic member and a phase member, respectively, of a phase plate 262, and 268–275 represent polarization states in a plane parallel to the substrates.

Referring to FIG. 28A, incident light 232 having random polarization components is converted into linearly polarized light 268 by the polarizer 210.

Light passing through the liquid crystal layer is not substantially subject to optical rotation by liquid crystal molecules and light emitted through the emission side substrate becomes linearly polarized light 269 having a polarization axis substantially perpendicular to the transmission axis of the analyzer 211. As a result, the emitted light 271 from the analyzer 211 becomes substantially zero. For simplicity, the above-mentioned phase modulation by birefringence of liquid crystal is neglected for the time being.

Referring to FIG. 28B regarding a bright line portion, incident light 232 having random polarization components is converted by the polarizer 210 into linearly polarized light 272. At the bright line portion, the alignment of the liquid crystal layer is distorted by a lateral electric field as described above. As a result, emitted light through the emission side substrate 243 becomes elliptically polarized light 273 containing a polarized light component parallel to the transmission axis of the analyzer 211. If the retardation of the polarized light 273 is denoted by Δ, the phase member 273 is designed to provide a retardation −Δ, so that the polarized light 273 is phase-compensated when it passes through the phase member 274, to provide linearly polarized light having a polarization axis substantially perpendicular to the transmission axis of the analyzer 211. As a result, the emitted light 275 from the analyzer 211 becomes substantially zero.

Thus, by compensating the phase of polarized light at a disclination with a phase plate, the occurrence of a bright line can be suppressed to prevent light leakage through the whole black display region of a liquid crystal device. Accordingly, it becomes unnecessary to provide a mask required conventionally, thus providing an increased aperture ratio. Particularly, in a liquid crystal display device, a high brightness and a high contrast can be realized to provide remarkably improved display performances.

Further, in this embodiment, as the unevenness of the phase plate is removed, the optical performances are less liable to be lowered due to occurrence of ghost, etc.

Figure 29:
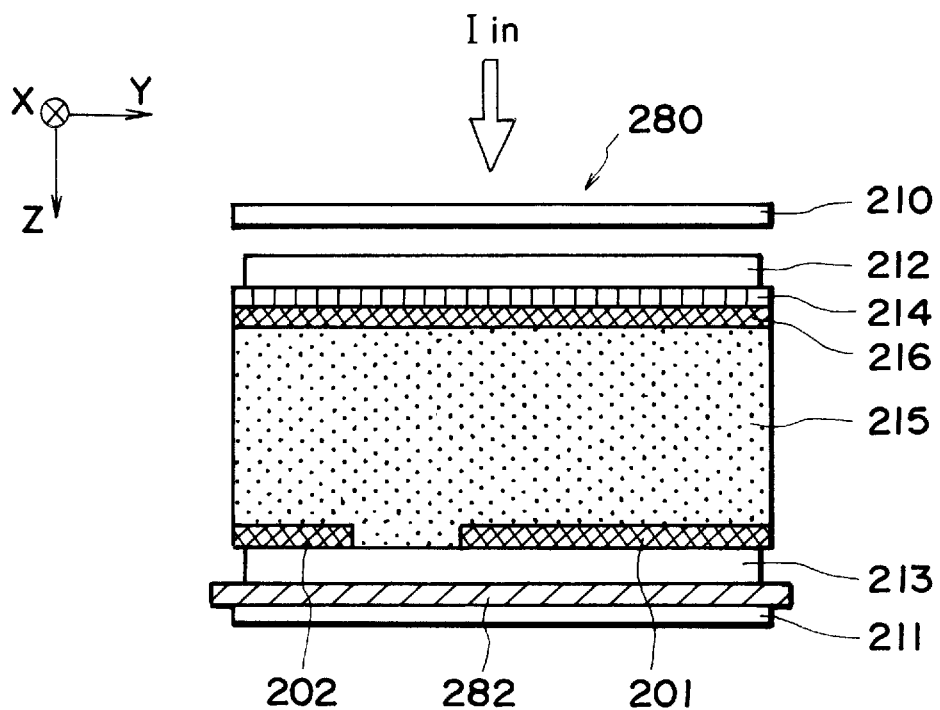
FIG. 29 is a schematic sectional view of a liquid crystal device according to a seventh embodiment of the invention.

(Seventh embodiment) FIG. 29 is a schematic sectional view of almost one pixel of a liquid crystal device according to the seventh embodiment of the present invention. The liquid crystal device 280 is an active matrix-type one including a plurality of pixels arranged in a matrix. In FIG. 29, members identical to those shown in FIG. 22 for the fifth embodiment are denoted by identical reference numerals, and the description thereof is omitted. The coordinate axes are taken in the same manner as in FIG. 22. The liquid crystal device shown in FIG. 29 includes a phase plate 262 according to this embodiment.

Figure 30A:
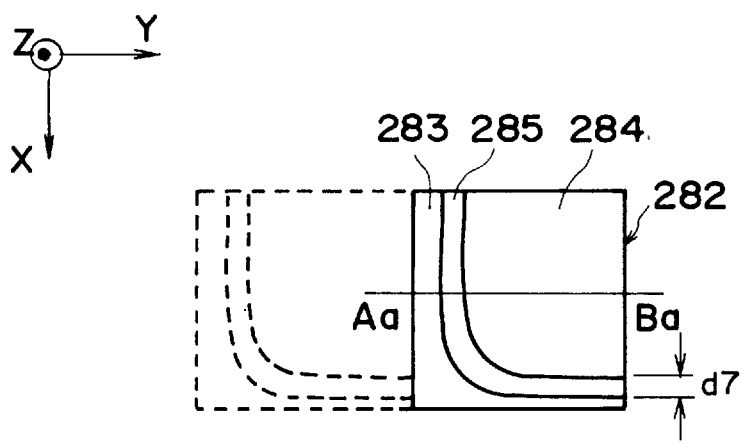
FIG. 30A is a schematic sectional view of a phase plate used therein.
Figure 30B:
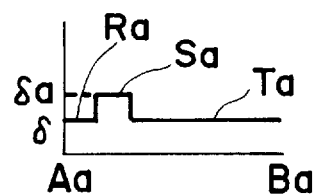
FIG. 30B is a retardation distribution along an Aa-Ba section thereof.

FIG. 30A is a schematic plan view of an example of the phase plate 282 according to this embodiment, and FIG. 30B is a graph sowing a retardation distribution of the phase plate 282 along an Aa–Ba line in FIG. 30A.

The phase plate 282 comprises optical members (phase members) 283–285 having a uniaxial or biaxial optical anisotropy of which the members 283 and 284 have an identical optical anisotropy.

As shown in FIG. 30A, the phase member 285 is formed to have a certain width d7 in a plane parallel to the substrates 212 and 213 of the liquid crystal device in a rectangular region corresponding to one pixel and has a shape of almost L extending from one peripheral side to another neighboring peripheral side of the rectangular region. The phase members 283 and 274 occupy the other portion of the rectangular region corresponding to one pixel. As shown n FIG. 30B, a region Ra corresponding to the phase member 283 and a region Ta corresponding to the phase member 284 have a retardation 67 corresponding to the retardation of the liquid crystal and a region Sa corresponding to the phase member 285 has a retardation δa.

The phase members 283–285 may be produced and patterned in a similar manner as the phase plate in the first to fifth embodiments. Alternatively, a sheet of a transparent plastic material may be locally selectively subjected to a treatment, such as compression or stretching to provide the phase member 285 integral with the isotropic members 283 and 284. The above-mentioned certain width d7 corresponds to the shape of a disclination and/or a bright line occurring in a pixel and need not be constant while varying depending on the shape of the disclination and/or bright line.

Figures 31A, 31B:
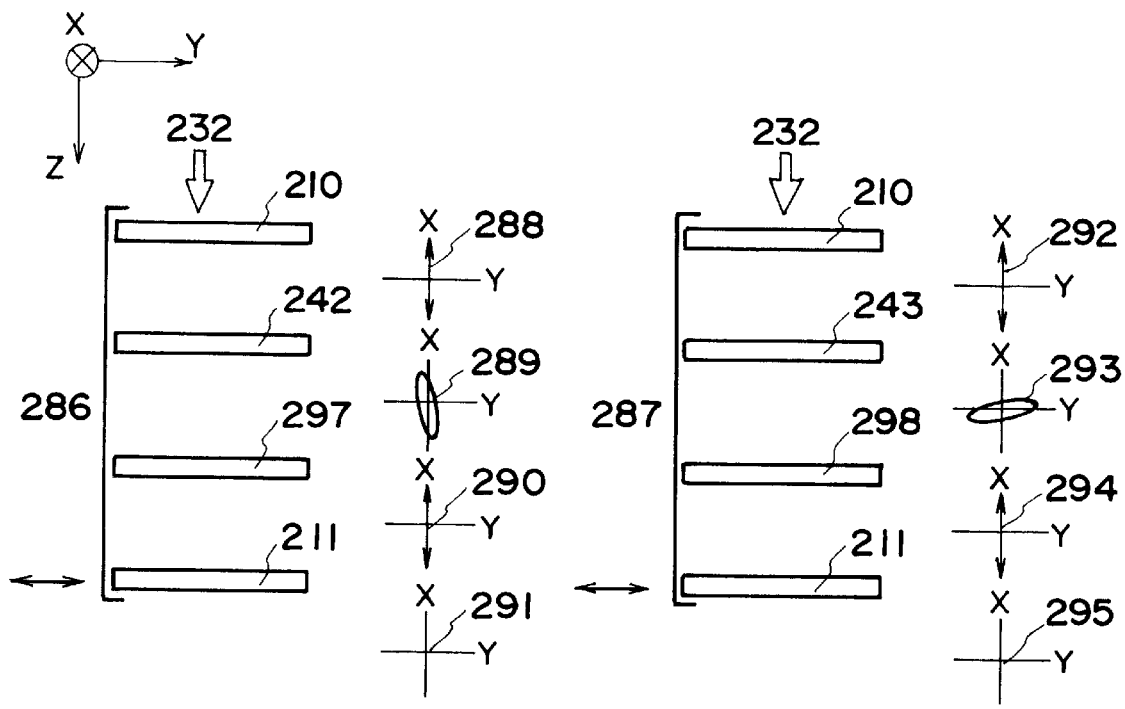

Now, the behavior of light incident to a black display region (pixel) and a bright line portion therein of the liquid crystal device 280 according to this embodiment will be described with reference to FIG. 31A showing the behavior of light entering the black display region and FIG. 31B showing the behavior of light entering the bright line portion. In FIGS. 31A and 31B, numeral 286 roughly represents a section corresponding to a black display region of the liquid crystal device 280 and 287 roughly represents a section corresponding to a bright line portion of the liquid crystal device 280. Further, 210 denotes a polarizer having a transmission axis in the X-axis direction, and 211 denotes an analyzer having a transmission axis in the Y-axis direction. Numerals 242 and 243 represent portions in a liquid crystal layer from one substrate to the other substrate, 297 and 298 denote an isotropic member and a phase member, respectively, of a phase plate 282, and 288–295 represent polarization states in a plane parallel to the substrates.

Referring to FIG. 31A, incident light 232 having random polarization components is converted into linearly polarized light 288 by the polarizer 210. Light passing through the emission side substrate 213 has been affected by the refringence of liquid crystal molecules attributable to a pretilt, etc., to provide elliptically polarized light 289 having a polarization axis substantially perpendicular to the transmission axis of the analyzer 211. If the retardation of the elliptically polarized light is denoted by Δ, the phase member 298 is provided with an optical axis in an adequately set direction and is designed to provide a retardation of −Δ. As a result, when passing through the phase member 298, the elliptically polarized light 289 is phase-compensated to form linearly polarized light having a polarization axis substantially perpendicular to the transmission axis of the analyzer, whereby the emitted light 291 through the analyzer becomes substantially zero.

Referring to FIG. 31B regarding a bright line portion, incident light 232 having random polarization components is converted by the polarizer 210 into linearly polarized light 292. At the bright line portion, the alignment of the liquid crystal layer is distorted by a lateral electric field as described above. Further, due to a pretilt angle, etc., the liquid crystal is provided with a birefringence. Due to influence of these factors, emitted light through the emission side substrate becomes polarized light 293 containing a polarized light component parallel to the transmission axis of the analyzer 211. If the retardation of the polarized light 293 is denoted by Δ, the phase member 298 is designed to provide a retardation −Δ, so that the polarized light 293 is phase-compensated when it passes through the phase member 298, to provide linearly polarized light 294 having a polarization axis substantially perpendicular to the transmission axis of the analyzer 211. As a result, the emitted light 295 from the analyzer 211 becomes substantially zero.

Thus, by compensating the phase of polarized light at a disclination with a phase plate, the occurrence of a bright line can be suppressed. Further, the phase of polarized light passing through the other portions than the disclination is also compensated by the phase plate, whereby light leakage through the whole black display region of a liquid crystal device is prevented. Accordingly, it becomes unnecessary to provide a mask required conventionally, thus providing an increased aperture ratio. Particularly, in a liquid crystal display device, a high brightness and a high contrast can be realized to provide remarkably improved display performances.

As described above, in the fifth to seventh embodiments, phase compensation is optimized so as to suppress the occurrence of bright lines in the light interrupting state (black display state), but phase compensation for other types of optimization is also possible. For example, in a liquid crystal device for gradational display, it is possible to effect phase compensation for optimization at arbitrary gradation levels or optimization for giving a good balance among plural gradation levels.

Figures 32A, 32B:
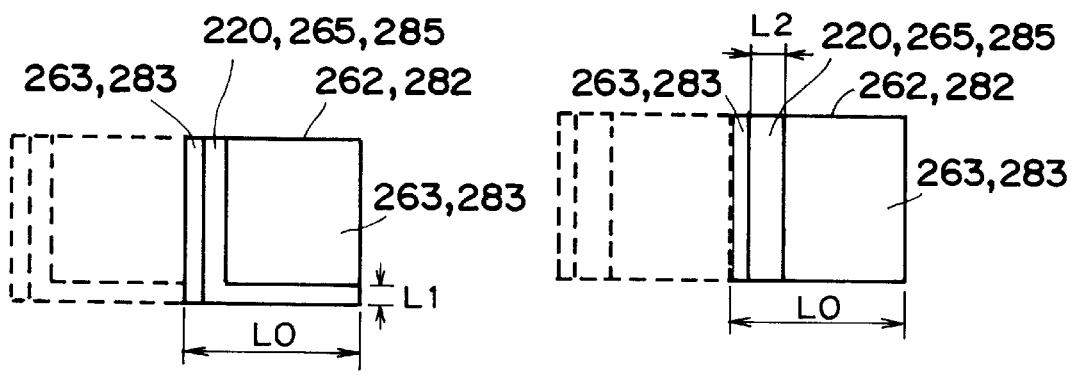
FIGS. 32A and 32B are respectively a schematic plan view of an embodiment of the optical member according to the invention.

Now, some other examples of an optical member having a non-uniform optical anisotropy in one pixel like phase plates in the above-mentioned fifth to seventh embodiments with reference to FIGS. 32A and 32B, wherein members identical to those shown in FIGS. 23, 27 and 20 are denoted by identical numerals, and description thereof is omitted.

If the phase member 220, 265 or 285 is formed in an L-shape free from a curve, the production of a phase plate can be simplified.

Further, by forming the phase member 220, 265 or 285 in the shape of a character I, the production of a phase plate is further simplified. In this instance, only a part of the disclination portion is subject to phase compensation, but it is still possible to provide a higher aperture ratio than in a conventional device. In this instance, it is possible to form phase members in the form of stripes over a large number of pixels, whereby the production is further simplified.

In the embodiments shown in FIGS. 32a and 32B, for a liquid crystal device having a pixel size L0 of, e.g., ca. 100 μm, a bright line width corresponding to a disclination may be on the order of 1–5 pm, and the location of a bright line is almost constant but can be fluctuated with a deviation of ca. 1–10 pm. Accordingly, the width L1 or L2 of the phase member 220, 265 or 285 may preferably be ca. 1–25 μm, particularly 10–25 μm so as to cope with a device-to-device fluctuation, thereby simplifying the mass production.

By the above-mentioned first to seventh embodiments, the optical members (phase plate, retardation plate, phase member) have been described as a member having a uniaxial or biaxial optical anisotropy but can also be a member having a more complicated optical anisotropy, such as a twisted orientation, developed in recent years.

What is claimed is:

1. A liquid crystal device, comprising a pair of substrates and a liquid crystal disposed between the substrates, said liquid crystal device further comprising an optical member having a planar extension parallel to the substrates; wherein said optical member has a distribution of optical anisotropy which varies from a center to a periphery in the planar extension, such that lines each joining points of equal optical anisotropy do not intersect each other in the planar extension.

2. A liquid crystal device according to claim 1, further including at least one polarizer; wherein said optical member is disposed between the polarizer and the substrates.

3. A liquid crystal device according to claim 1, further including a plurality of color filters having different transmission light spectra, and said optical member has an optical anisotropy distribution corresponding to the plurality of color filters, respectively.

4. A liquid crystal device according to claim 3, wherein each color filter has a side length of 50–300 μm.

5. A liquid crystal device according to claim 1, further including a light source having a spectral distribution, wherein said optical member has an optical anisotropy distribution corresponding to the spectral distribution of the light source.

6. A liquid crystal apparatus, comprising a liquid crystal device according to claim 1, and a projection optical system for projecting emitted light from the liquid crystal device onto a projection panel to form an image on the projection panel, wherein
    said optical member has an optical anisotropy distribution corresponding to an angle between a principal ray in a light flux guided from the liquid crystal panel to the projection optical system and a normal to the substrates of the liquid crystal device.

7. A liquid crystal apparatus, comprising a liquid crystal device according to claim 1, a relay optical system for receiving emitted light from the liquid crystal panel and forming a spatial image based on the emitted light, and an ocular optical system for observing the spatial image as a virtual image; wherein
    said optical member has an optical anisotropy distribution corresponding to an angle between a principal ray in a light flux guided from the liquid crystal panel to the relay optical system and a normal to the substrates of the liquid crystal device.

8. A liquid crystal device of the active matrix type, comprising a pair of substrates and a liquid crystal disposed between the substrates so as to form a matrix of rectangular pixels; each pixel being provided with a source line disposed alone a side of the pixel; a gate line disposed along another side of the pixel and intersecting the source line, and a switching device disposed at an intersection of the source and gate lines close to a corner of the pixel;
    said liquid crystal device further comprising an optical member having a planar extension parallel to the substrates and divided into regions, each region corresponding to a pixel and having a sub-region of optical anisotropy covering a Portion of the pixel close to a switching device provided to the pixel.

9. A liquid crystal device according to claim 8, further including at least one polarizer; wherein said optical member is disposed between the polarizer and the substrates.

10. A liquid crystal device according to claim 8, wherein said optical member includes at least a first optical member having an optical anisotropy along its planar extension and a second optical member having an optical isotropy or having an optical anisotropy different from that of the first optical member, said sub-region of optical anisotropy being provided by the first optical member.

11. A liquid crystal device according to claim 10, wherein said first optical member has a shape of almost character L on its planar extension.

12. A liquid crystal device according to claim 10, wherein said first optical member extends in the form of stripes on its planar extension.

13. A liquid crystal device according to claim 10, wherein each region of the optical member corresponding to a pixel is rectangular in shape and said first optical member extends between neighboring two sides of the rectangular region.

14. A liquid crystal device according to any of claims 1 or 8, wherein said optical member comprises a laminate of plural sheet members each having a uniform optical anisotropy.

15. A liquid crystal device according to any of claims 1 or 8, wherein said optical member has been patterned by photolithography.

16. A liquid crystal device according to any of claims 1 or 8, wherein said optical member has been patterned by sputtering.

17. A liquid crystal device according to any of claims 1 or 8, wherein said optical member has been patterned by etching.

18. A liquid crystal device according to any of claims 1 or 8, wherein said liquid crystal is a nematic liquid crystal.

19. A liquid crystal device according to any of claim 1 or 8, wherein said liquid crystal is aligned in a twisted nematic mode.

20. A liquid crystal apparatus, comprising a liquid crystal device according to any of claims 1 or 8, and a drive means for driving the liquid crystal device.

* * * * *

UNITED STATES PATENT AND TRADEMARK OFFICE
CERTIFICATE OF CORRECTION

PATENT NO. : 5,854,665

DATED : December 29, 1998

INVENTOR(S) : JUN IBA

It is certified that error appears in the above-identified patent and that said Letters Patent is hereby corrected as shown below:

COLUMN 1

Line 40, "incident" should read --incident light--.
Line 54, "dark)display" should read --dark) display--.

COLUMN 2

Line 31, "above mentioned" should read --above-mentioned--.

COLUMN 4

Line 2, "line(s)" should read --line(s)"--.

COLUMN 7

Line 8, "FIG. 15A" should read --FIGS. 15A--.
Line 32, "schematic" (second occurrence) should read --liquid--.

UNITED STATES PATENT AND TRADEMARK OFFICE
CERTIFICATE OF CORRECTION

PATENT NO. : 5,854,665
DATED : December 29, 1998
INVENTOR(S) : JUN IBA

It is certified that error appears in the above-identified patent and that said Letters Patent is hereby corrected as shown below:

COLUMN 8

Line 47, "according to representatively a TN-mode or may be" should read --appropriate for a TH-mode or--.

COLUMN 10

Line 5, "plates" should read --plate--.

COLUMN 11

Line 30, "angle 0" should read --angle $\theta$--.
    Line 42, "FIG. 13," should read --FIG. 13--.

COLUMN 12

Line 38, "FIG. 18A," should read --In FIG. 18A,--.

UNITED STATES PATENT AND TRADEMARK OFFICE
CERTIFICATE OF CORRECTION

PATENT NO. : 5,854,665

DATED : December 29, 1998

INVENTOR(S) : JUN IBA

It is certified that error appears in the above-identified patent and that said Letters Patent is hereby corrected as shown below:

COLUMN 13

Line 22, "embodiment)" should read --Embodiment)--.

COLUMN 16

Line 20, "embodiment)" should read --Embodiment)--
   Line 33, "sowing" should read --showing--.
   Line 55, "member 263" should read --members 263--.

COLUMN 17

Line 41, "273" should read --278--.
   Line 60, "embodiment)FIG. 29" should read
     --Embodiment) ¶ FIG. 29--.

COLUMN 18

Line 2, "plate 262" should read --plate 282--.
   Line 6, "sowing" should read --showing--.
   Line 18, "274" should read --284--.
   line 19, "n" should read --in--.

UNITED STATES PATENT AND TRADEMARK OFFICE
CERTIFICATE OF CORRECTION

PATENT NO. : 5,854,665

DATED : December 29, 1998

INVENTOR(S) : JUN IBA

It is certified that error appears in the above-identified patent and that said Letters Patent is hereby corrected as shown below:

COLUMN 20

Line 54, "alone" should read --along--.
    Line 63, "Portion" should read --portion--.

COLUMN 22

Line 13, "claim 1" should read --claims 1--.

Signed and Sealed this

Twenty-eighth Day of December, 1999

Attest:

Q. TODD DICKINSON

Attesting Officer    Acting Commissioner of Patents and Trademarks